US011995780B2

(12) United States Patent
Goodrich et al.

(10) Patent No.: US 11,995,780 B2
(45) Date of Patent: May 28, 2024

(54) SHOOTING INTERACTION USING AUGMENTED REALITY CONTENT IN A MESSAGING SYSTEM

(71) Applicant: Snap Inc., Santa Monica, CA (US)

(72) Inventors: Kyle Goodrich, Venice, CA (US); Maxim Maximov Lazarov, Culver City, CA (US); Andrew James McPhee, Culver City, CA (US); Daniel Moreno, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 17/941,301

(22) Filed: Sep. 9, 2022

(65) Prior Publication Data
US 2024/0087243 A1    Mar. 14, 2024

(51) Int. Cl.
*G06T 19/00*    (2011.01)
*G06F 3/01*    (2006.01)
(Continued)

(52) U.S. Cl.
CPC .......... *G06T 19/006* (2013.01); *G06F 3/017* (2013.01); *G06T 7/70* (2017.01); *G06V 40/28* (2022.01); *G06T 2207/30196* (2013.01)

(58) Field of Classification Search
CPC ........ G06F 1/163; G06F 1/1698; G06F 13/00; G06F 3/01; G06F 3/011; G06F 3/017;
(Continued)

(56) References Cited

U.S. PATENT DOCUMENTS

| 7,971,156 B2 | 6/2011 | Albertson et al. |
| 7,996,793 B2 | 8/2011 | Latta et al. |

(Continued)

FOREIGN PATENT DOCUMENTS

| CN | 103049761 | 8/2016 |
| CN | 113608619 A | 11/2021 |

(Continued)

OTHER PUBLICATIONS

"U.S. Appl. No. 17/941,292, Non Final Office Action dated Oct. 6, 2023", 11 pgs.
(Continued)

*Primary Examiner* — Nelson M Rosario
(74) *Attorney, Agent, or Firm* — Schwegman Lundberg & Woessner, P.A.

(57) ABSTRACT

The subject technology receives a set of frames. The subject technology detect a first gesture correspond to an open trigger finger gesture. The subject technology receives a second set of frames. The subject technology detects from the second set of frames, a second gesture correspond to a closed trigger finger gesture. The subject technology detects a location and a position of a representation of a finger from the closed trigger finger gesture. The subject technology generates a first virtual object based at least in part on the location and the position of the representation of the finger. The subject technology renders a movement of the first virtual object along a vector away from the location and the position of the representation of the finger within a first scene. The subject technology provides for display the rendered movement of the first virtual object along the vector within the first scene.

18 Claims, 29 Drawing Sheets

(51) Int. Cl.
  *G06T 7/70* (2017.01)
  *G06V 40/20* (2022.01)
(58) Field of Classification Search
  CPC ....... G06F 3/16; H04L 67/125; H04L 67/535;
    H04L 67/01; H04W 4/023; H04W 4/026;
    H04W 4/12; H04M 3/42382; G06V
    10/34; G06V 20/20; G06V 40/113; G06V
    40/28
  See application file for complete search history.

(56) References Cited

U.S. PATENT DOCUMENTS

| | | | |
|---|---|---|---|
| 8,487,938 | B2 | 7/2013 | Latta et al. |
| 8,856,691 | B2 | 10/2014 | Geisner et al. |
| 9,225,897 | B1 | 12/2015 | Sehn et al. |
| 9,230,160 | B1 | 1/2016 | Kanter |
| 9,276,886 | B1 | 3/2016 | Samaranayake |
| 9,383,895 | B1 | 7/2016 | Vinayak et al. |
| 9,705,831 | B2 | 7/2017 | Spiegel |
| 9,742,713 | B2 | 8/2017 | Spiegel et al. |
| 10,102,423 | B2 | 10/2018 | Shaburov et al. |
| 10,284,508 | B1 | 5/2019 | Allen et al. |
| 10,439,972 | B1 | 10/2019 | Spiegel et al. |
| 10,509,466 | B1 | 12/2019 | Miller et al. |
| 10,514,876 | B2 | 12/2019 | Sehn |
| 10,614,855 | B2 | 4/2020 | Huang |
| 10,748,347 | B1 | 8/2020 | Li et al. |
| 10,958,608 | B1 | 3/2021 | Allen et al. |
| 10,962,809 | B1 | 3/2021 | Castañeda |
| 10,996,846 | B2 | 5/2021 | Robertson et al. |
| 10,997,787 | B2 | 5/2021 | Ge et al. |
| 11,012,390 | B1 | 5/2021 | Al Majid et al. |
| 11,030,454 | B1 | 6/2021 | Xiong et al. |
| 11,036,368 | B1 | 6/2021 | Al Majid et al. |
| 11,054,896 | B1 | 7/2021 | Wilytsch et al. |
| 11,062,498 | B1 | 7/2021 | Voss et al. |
| 11,087,728 | B1 | 8/2021 | Canberk et al. |
| 11,092,998 | B1 | 8/2021 | Castañeda et al. |
| 11,106,342 | B1 | 8/2021 | Al Majid et al. |
| 11,126,206 | B2 | 9/2021 | Meisenholder et al. |
| 11,143,867 | B2 | 10/2021 | Rodriguez, II |
| 11,169,600 | B1 | 11/2021 | Canberk et al. |
| 11,227,626 | B1 | 1/2022 | Krishnan Gorumkonda et al. |
| 2007/0174774 | A1 | 7/2007 | Lerman et al. |
| 2009/0012788 | A1 | 1/2009 | Gilbert et al. |
| 2011/0050562 | A1 | 3/2011 | Schoen et al. |
| 2011/0301934 | A1 | 12/2011 | Tardif |
| 2012/0113223 | A1 | 5/2012 | Hilliges et al. |
| 2013/0155255 | A1 | 6/2013 | Yu |
| 2013/0303247 | A1* | 11/2013 | Wu ........................ A63F 13/837 345/156 |
| 2013/0307875 | A1 | 11/2013 | Anderson |
| 2014/0171036 | A1 | 6/2014 | Simmons |
| 2015/0097862 | A1 | 4/2015 | Reisner-Kollmann et al. |
| 2015/0120293 | A1 | 4/2015 | Wohlert et al. |
| 2015/0169076 | A1 | 6/2015 | Cohen et al. |
| 2015/0220149 | A1 | 8/2015 | Plagemann et al. |
| 2015/0229837 | A1 | 8/2015 | Her et al. |
| 2015/0318020 | A1 | 11/2015 | Pribula |
| 2015/0370320 | A1 | 12/2015 | Connor |
| 2017/0092293 | A1 | 3/2017 | Kristjansson |
| 2017/0123487 | A1 | 5/2017 | Hazra et al. |
| 2017/0277684 | A1 | 9/2017 | Dharmarajan Mary |
| 2017/0277685 | A1 | 9/2017 | Takumi |
| 2017/0351910 | A1 | 12/2017 | Elwazer et al. |
| 2018/0158370 | A1 | 6/2018 | Pryor |
| 2018/0314337 | A1* | 11/2018 | Iwanami ................. G06F 3/16 |
| 2019/0215544 | A1 | 7/2019 | Hemmati et al. |
| 2020/0304708 | A1 | 9/2020 | Lee et al. |
| 2021/0011612 | A1 | 1/2021 | Dancie et al. |
| 2021/0074016 | A1 | 3/2021 | Li et al. |
| 2021/0166732 | A1 | 6/2021 | Shaburova et al. |
| 2021/0174034 | A1 | 6/2021 | Retek et al. |
| 2021/0241529 | A1 | 8/2021 | Cowburn et al. |
| 2021/0303075 | A1 | 9/2021 | Cowburn et al. |
| 2021/0303077 | A1 | 9/2021 | Anvaripour et al. |
| 2021/0303140 | A1 | 9/2021 | Mourkogiannis |
| 2021/0335148 | A1 | 10/2021 | Fujiwara et al. |
| 2021/0382564 | A1 | 12/2021 | Blachly et al. |
| 2021/0397000 | A1 | 12/2021 | Rodriguez, II |
| 2022/0083197 | A1 | 3/2022 | Rockel et al. |
| 2022/0171468 | A1* | 6/2022 | Konishi ................. G06F 3/0485 |
| 2022/0223179 | A1 | 7/2022 | Kang et al. |
| 2022/0335246 | A1 | 10/2022 | Bin W Mohamad Fablillah et al. |
| 2022/0408164 | A1 | 12/2022 | Lee et al. |
| 2023/0125393 | A1 | 4/2023 | Cheng et al. |
| 2023/0154134 | A1 | 5/2023 | Oh |

FOREIGN PATENT DOCUMENTS

| | | |
|---|---|---|
| EP | 3118722 A1 | 1/2017 |
| EP | 3707693 | 9/2020 |
| WO | WO-2012166680 A2 | 12/2012 |
| WO | WO-2013077883 A1 | 5/2013 |
| WO | WO-2015192117 A1 | 12/2015 |
| WO | 2016168591 | 10/2016 |
| WO | 2019094618 | 5/2019 |
| WO | WO-2021172832 A1 | 9/2021 |

OTHER PUBLICATIONS

"U.S. Appl. No. 17/941,435, Notice of Allowance dated Jun. 12, 2023", 8 pgs.
"U.S. Appl. No. 17/941,435, Notice of Allowance dated Nov. 8, 2023", 5 pgs.
"International Application Serial No. PCT/US2023/073609, International Search Report dated Dec. 6, 2023", 3 pgs.
"International Application Serial No. PCT/US2023/073609, Written Opinion dated Dec. 6, 2023", 5 pgs.
"International Application Serial No. PCT/US2023/073635, International Search Report dated Dec. 13, 2023", 4 pgs.
"International Application Serial No. PCT/US2023/073635, Written Opinion dated Dec. 13, 2023", 8 pgs.
"International Application Serial No. PCT/US2023/073639, International Search Report dated Dec. 1, 2023", 4 pgs.
"International Application Serial No. PCT/US2023/073639, Written Opinion dated Dec. 1, 2023", 8 pgs.
"International Application Serial No. PCT/US2023/073647, International Search Report dated Dec. 12, 2023", 3 pgs.
"International Application Serial No. PCT/US2023/073647, Written Opinion dated Dec. 12, 2023", 8 pgs.
"International Application Serial No. PCT/US2023/073776, International Search Report dated Nov. 17, 2023", 4 pgs.
"International Application Serial No. PCT/US2023/073776, Written Opinion dated Nov. 17, 2023", 7 pgs.
"International Application Serial No. PCT/US2023/073781, International Search Report dated Dec. 1, 2023", 3 pgs.
"International Application Serial No. PCT/US2023/073781, Written Opinion dated Dec. 1, 2023", 7 pgs.
"International Application Serial No. PCT/US2023/073783, International Search Report dated Dec. 6, 2023", 3 pgs.
"International Application Serial No. PCT/US2023/073783, Written Opinion dated Dec. 6, 2023", 8 pgs.
"International Application Serial No. PCT/US2023/073786, International Search Report dated Dec. 18, 2023", 3 pgs.
"International Application Serial No. PCT/US2023/073786, Written Opinion dated Dec. 18, 2023", 7 pgs.
Panzarino, Matthew, "Snapchat Adds Filters, a Replay Function and for Whatever Reason, Time, Temperature and Speed Overlays", TechCrunch, [Online] Retrieved form the Internet: < URL: https://techcrunch.com/2013/12/20/snapchat-adds-filters-new-font-and-for-some-reason-time-temperature-and-speed-overlays/>, (Dec. 20, 2013), 12 pgs.
U.S. Appl. No. 17/941,292, filed Sep. 9, 2022, Auto Trimming for Augmented Reality Content in Messaging Systems.
U.S. Appl. No. 17/941,303, filed Sep. 9, 2022, Cursor Functionality for Augmented Reality Content in Messaging Systems.

(56) References Cited

OTHER PUBLICATIONS

U.S. Appl. No. 17/941,293, filed Sep. 9, 2022, 3D Cursor Functionality for Augmented Reality Content in Messaging Systems.
U.S. Appl. No. 17/941,612, filed Sep. 9, 2022, Trigger Gesture for Selection of Augmented Reality Content in Messaging Systems.
U.S. Appl. No. 17/941,435, filed Sep. 9, 2022, Virtual Object Manipulation With Gestures in a Messaging System.
U.S. Appl. No. 17/941,522, filed Sep. 9, 2022, Gestures to Enable Menus Using Augmented Reality Content in a Messaging System.
U.S. Appl. No. 17/930,927, filed Sep. 9, 2022, Sculpting Augmenting Reality Content Using Gestures in a Messaging System.

* cited by examiner

FIG. 9

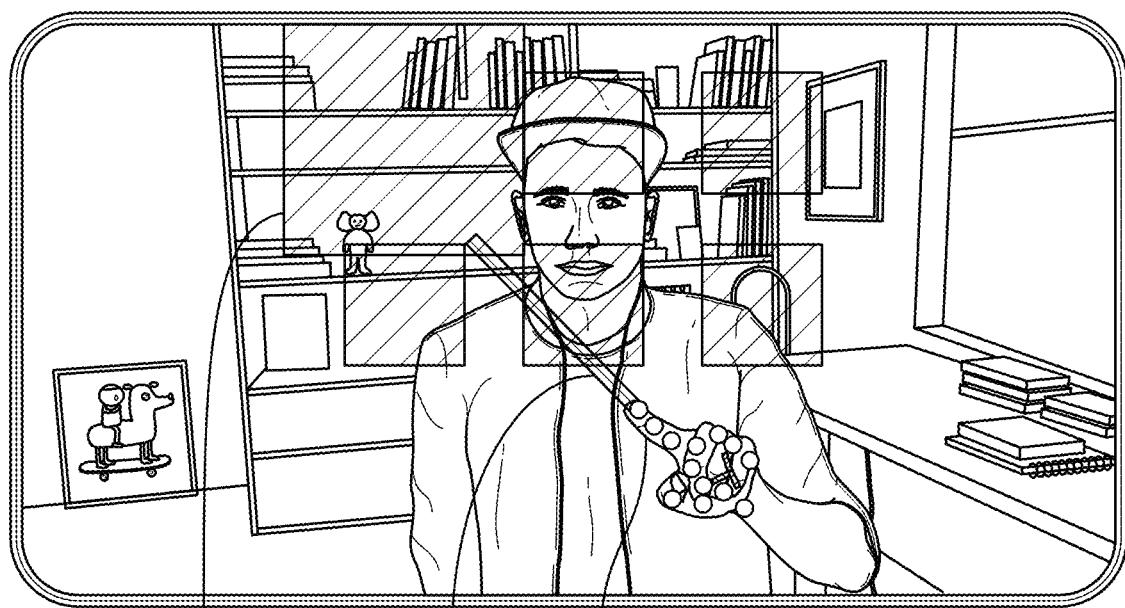
FIG. 10

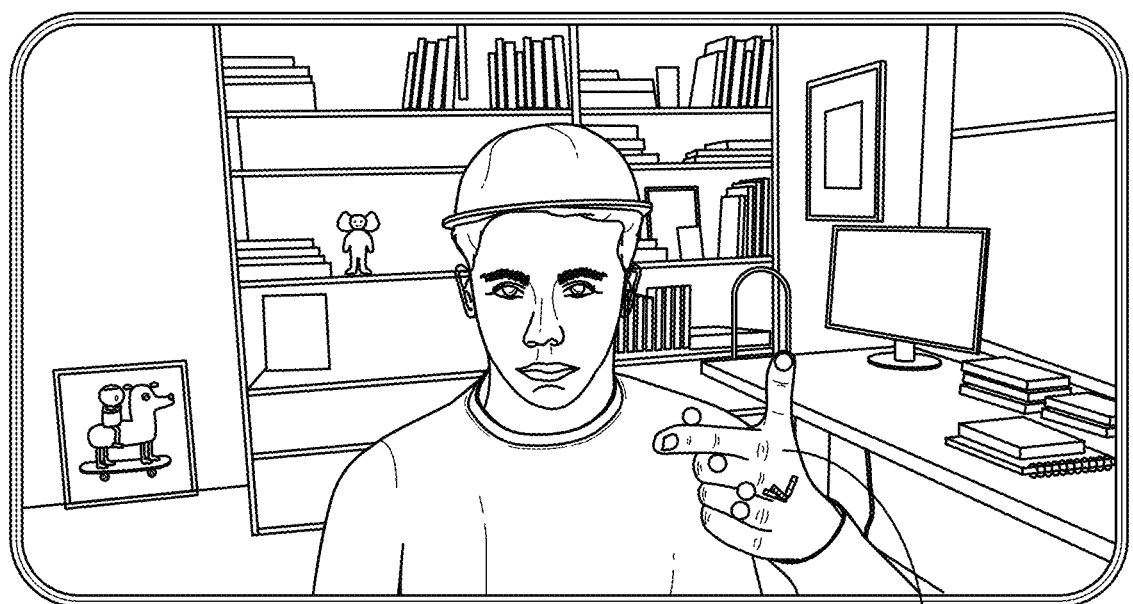
FIG. 11

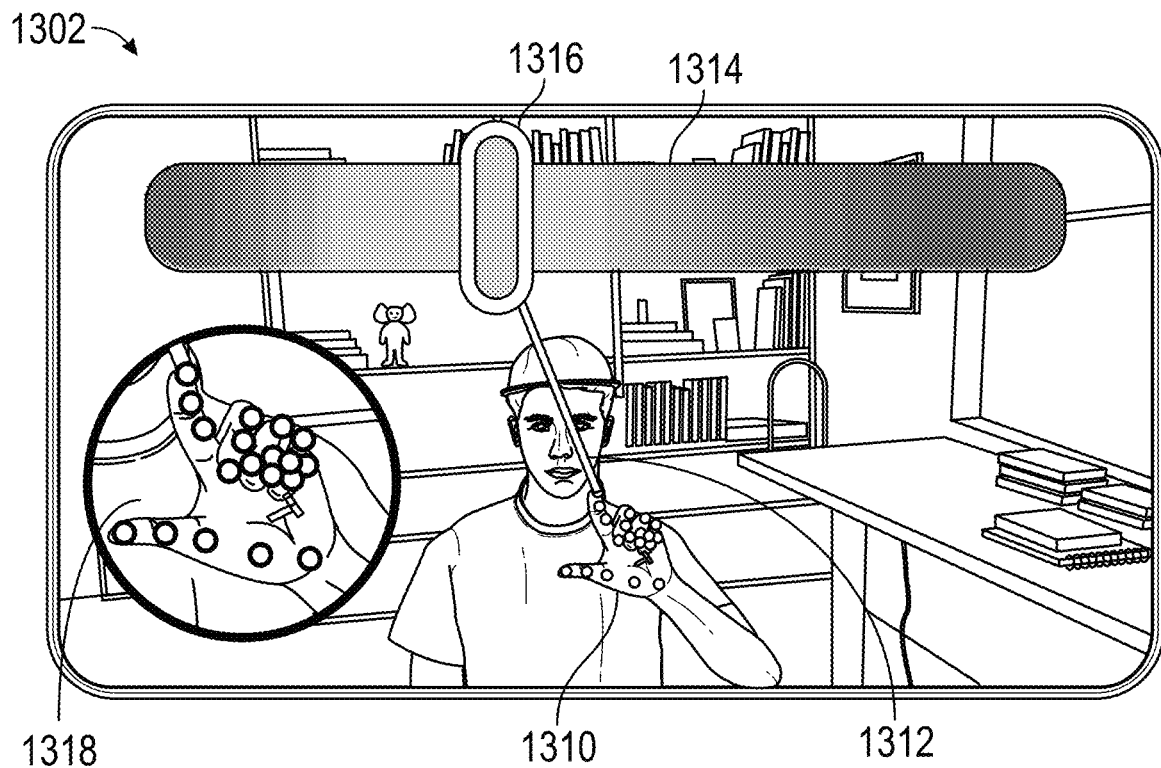
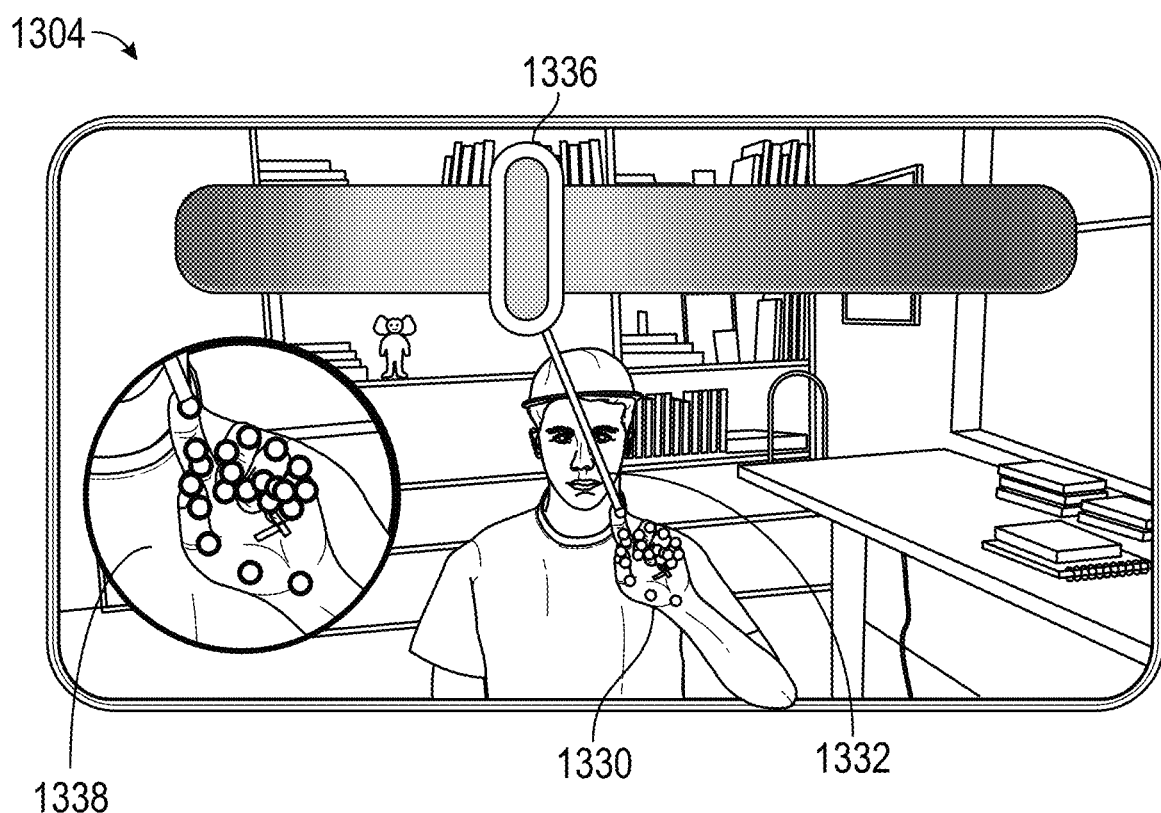
FIG. 13

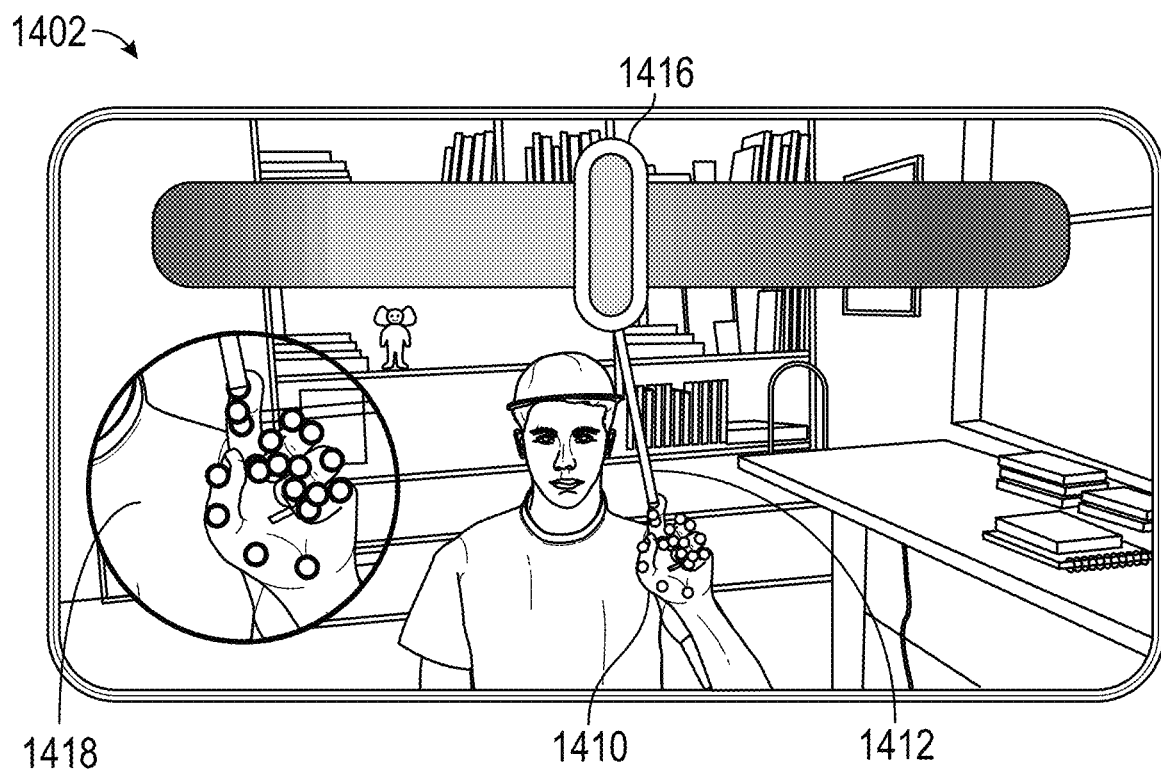
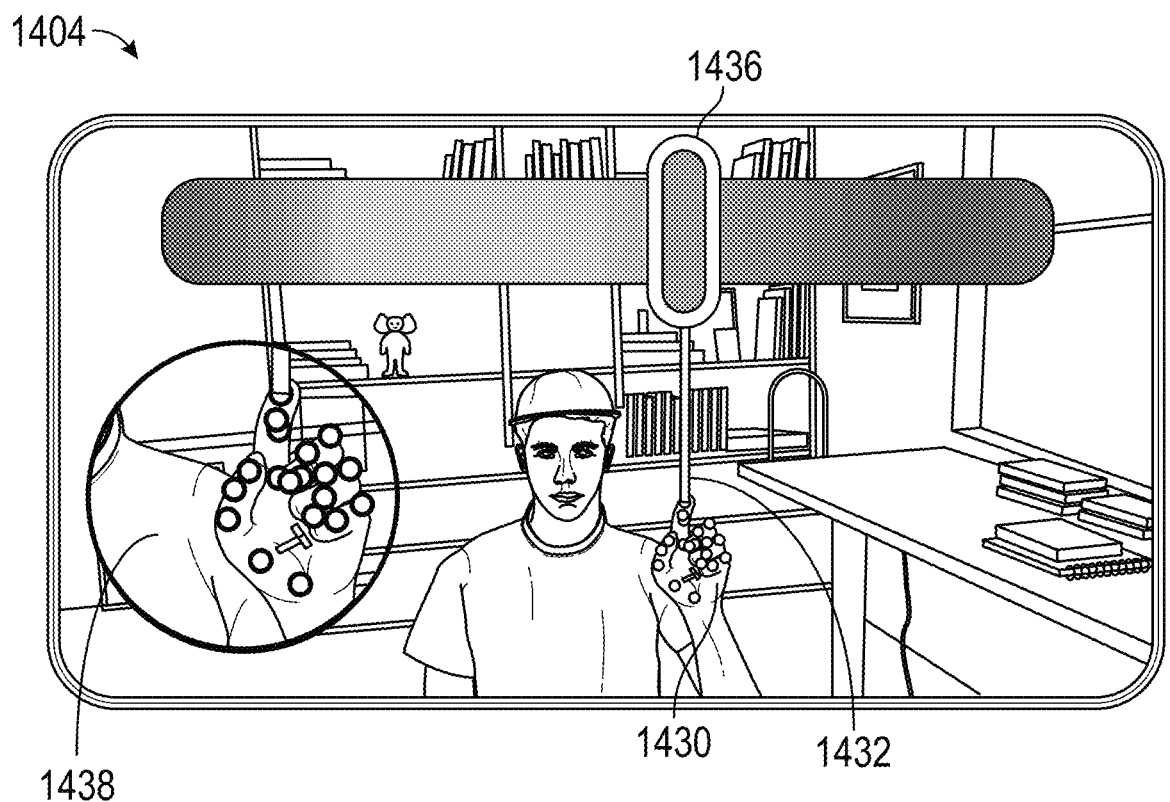
FIG. 14

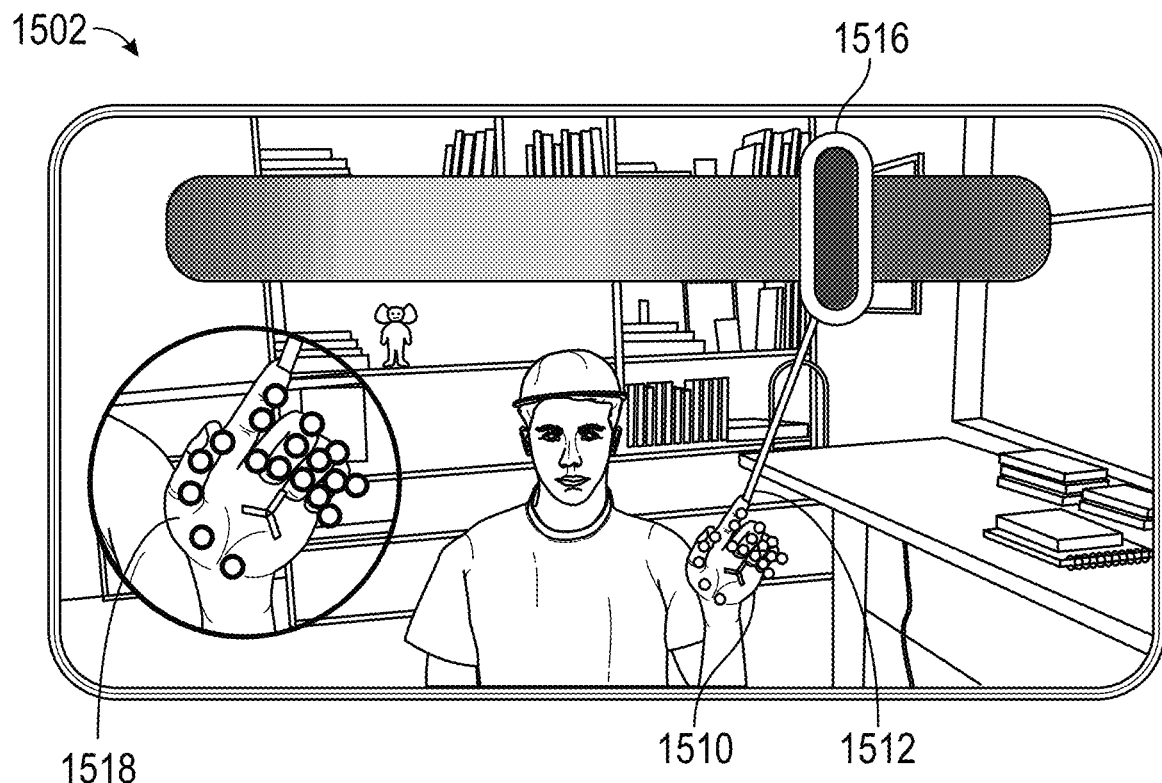
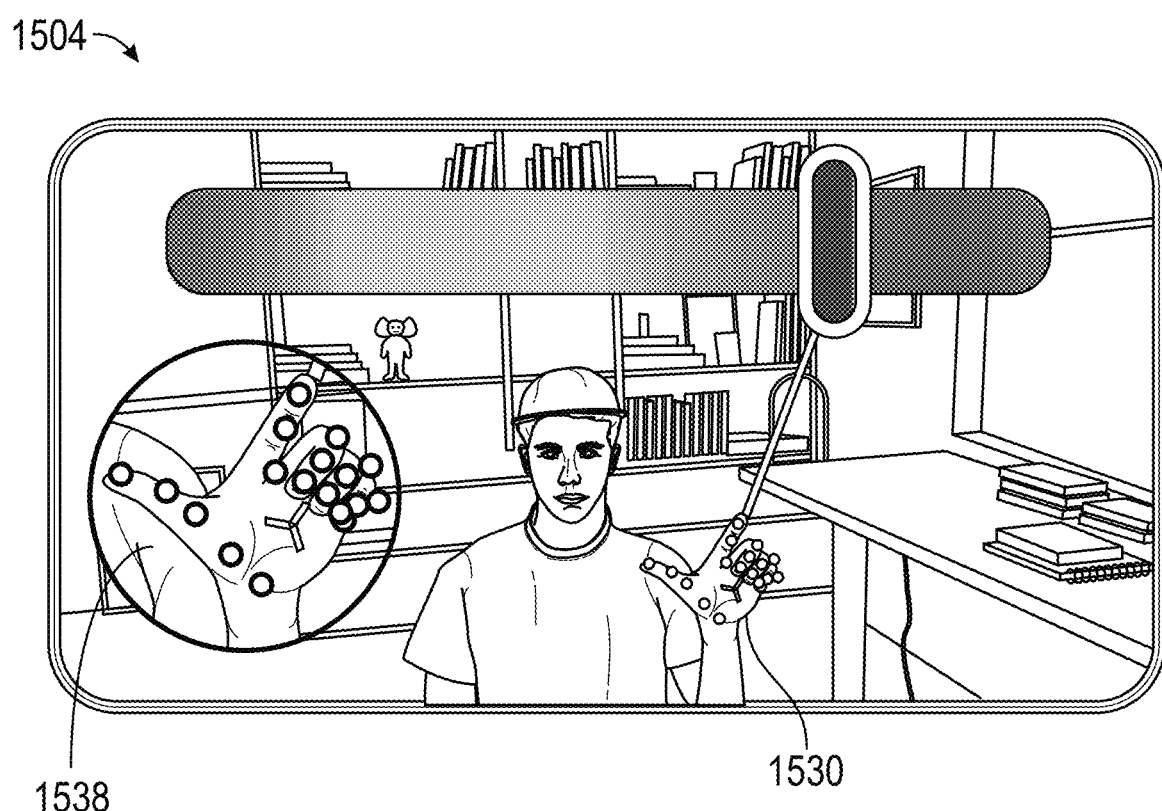
FIG. 15

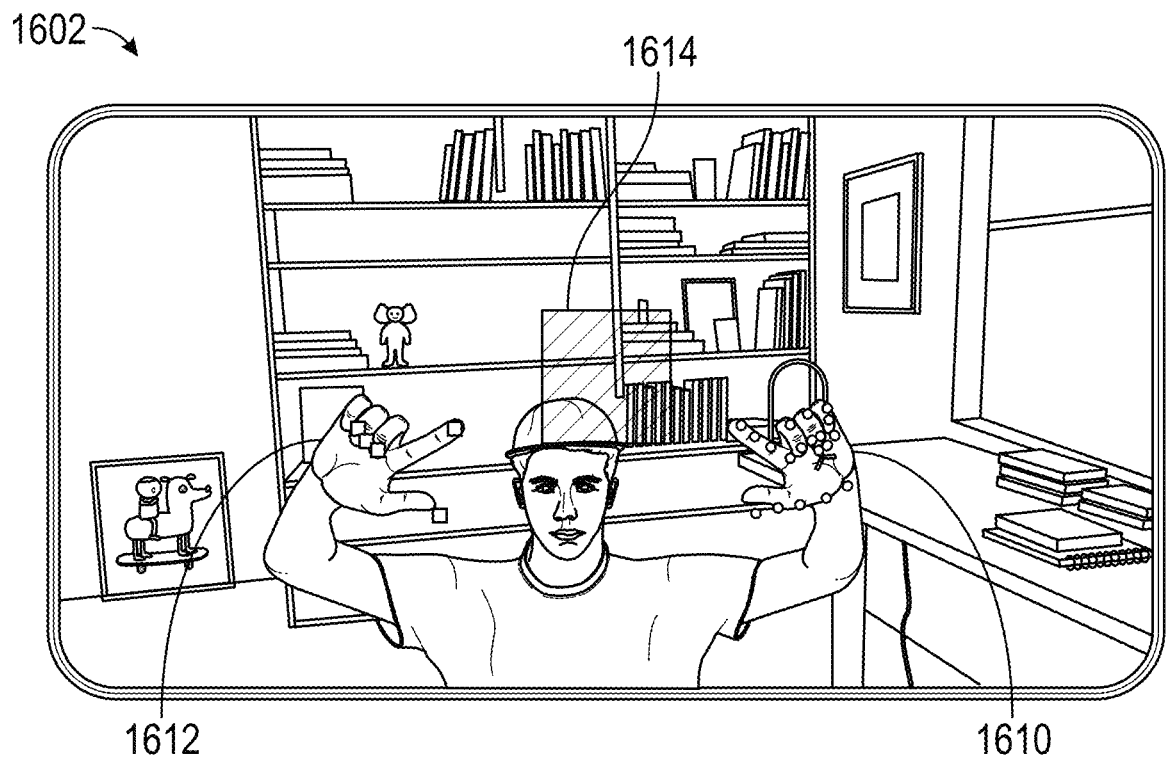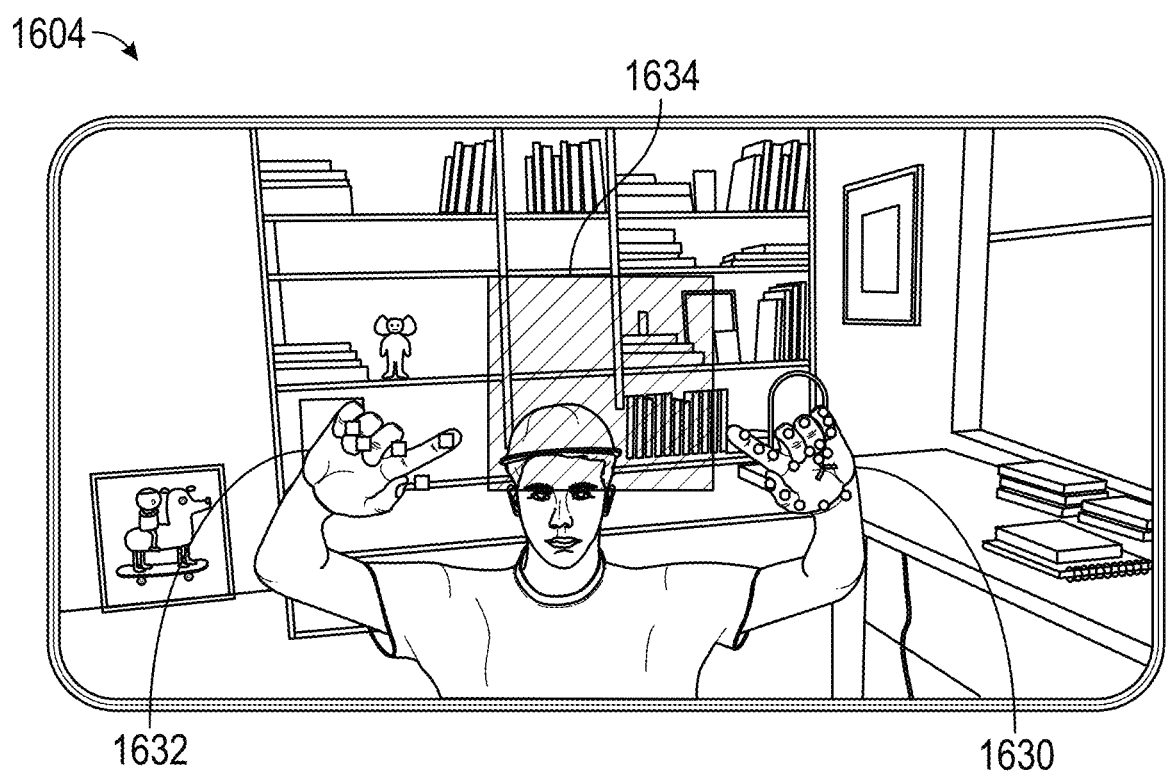
FIG. 16

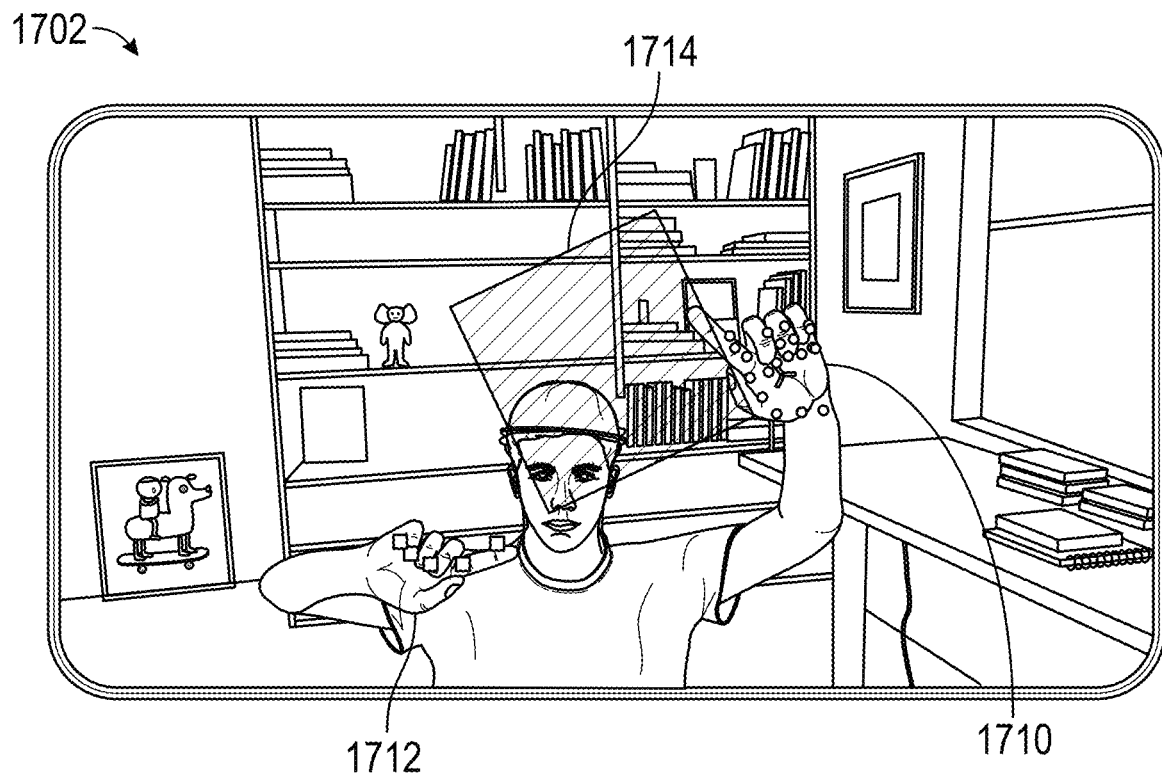
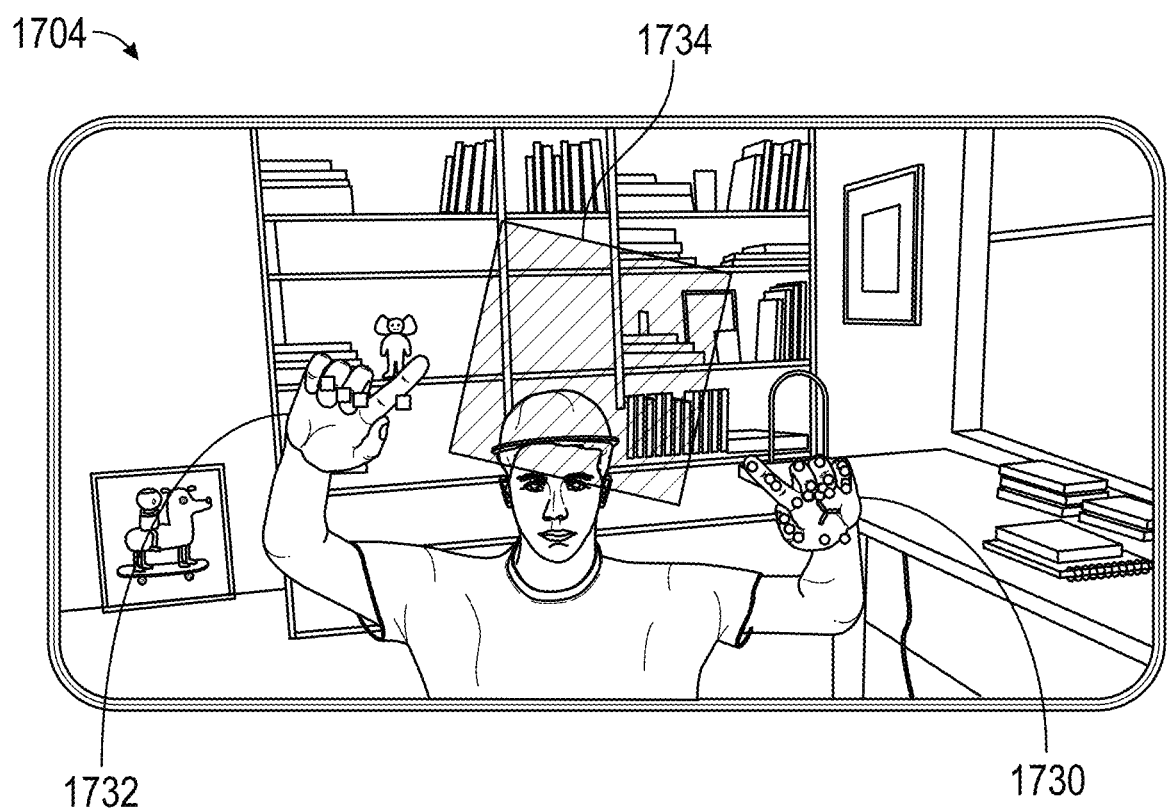
FIG. 17

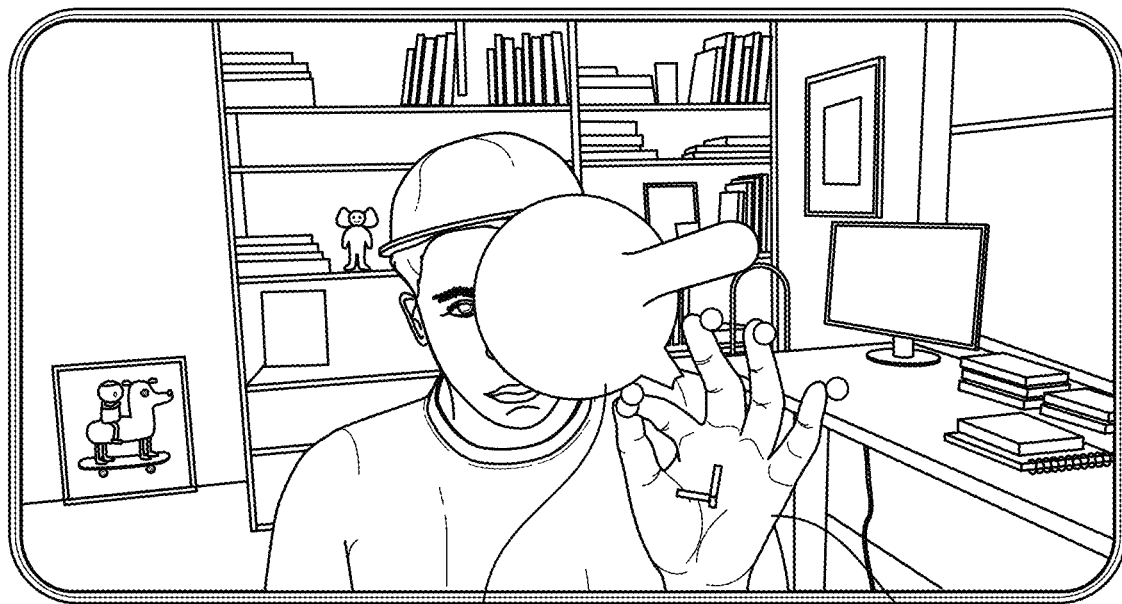
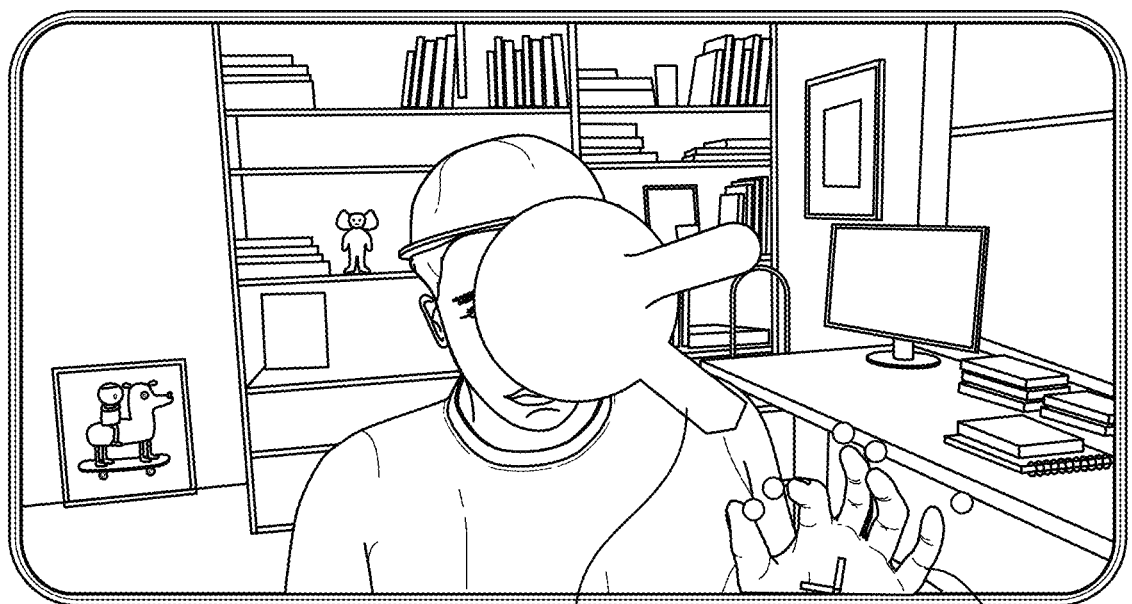
FIG. 20

2600

```
┌─────────────────────────────────────────────────────────────┐
│  RECEIVE A SET OF FRAMES CAPTURED BY A CAMERA OF A CLIENT   │
│                           DEVICE                             │
│                            2602                              │
└─────────────────────────────────────────────────────────────┘
                              ▼
┌─────────────────────────────────────────────────────────────┐
│  DETECT, FROM THE SET OF FRAMES, A FIRST GESTURE            │
│  CORRESPONDING TO AN OPEN TRIGGER FINGER GESTURE            │
│                            2604                              │
└─────────────────────────────────────────────────────────────┘
                              ▼
┌─────────────────────────────────────────────────────────────┐
│  RECEIVE A SECOND SET OF FRAMES CAPTURED BY THE CAMERA OF   │
│                     THE CLIENT DEVICE                        │
│                            2606                              │
└─────────────────────────────────────────────────────────────┘
                              ▼
┌─────────────────────────────────────────────────────────────┐
│  DETECT, FROM THE SECOND SET OF FRAMES, A SECOND GESTURE    │
│  CORRESPONDING TO A CLOSED TRIGGER FINGER GESTURE           │
│                            2608                              │
└─────────────────────────────────────────────────────────────┘
                              ▼
┌─────────────────────────────────────────────────────────────┐
│  DETECT A LOCATION AND A POSITION OF A REPRESENTATION OF A  │
│  FINGER FROM THE CLOSED TRIGGER FINGER GESTURE              │
│                            2610                              │
└─────────────────────────────────────────────────────────────┘
                              ▼
┌─────────────────────────────────────────────────────────────┐
│  GENERATE A FIRST VIRTUAL OBJECT BASED AT LEAST IN PART ON  │
│  THE LOCATION AND THE POSITION OF THE REPRESENTATION OF     │
│  THE FINGER                                                  │
│                            2612                              │
└─────────────────────────────────────────────────────────────┘
                              ▼
┌─────────────────────────────────────────────────────────────┐
│  RENDER A MOVEMENT OF THE FIRST VIRTUAL OBJECT ALONG A      │
│  VECTOR AWAY FROM THE LOCATION AND THE POSITION OF THE      │
│  REPRESENTATION OF THE FINGER WITHIN A FIRST SCENE          │
│                            2614                              │
└─────────────────────────────────────────────────────────────┘
                              ▼
┌─────────────────────────────────────────────────────────────┐
│  PROVIDE FOR DISPLAY THE RENDERED MOVEMENT OF THE FIRST     │
│  VIRTUAL OBJECT ALONG THE VECTOR WITHIN THE FIRST SCENE     │
│                            2616                              │
└─────────────────────────────────────────────────────────────┘
```

FIG. 26

SHOOTING INTERACTION USING AUGMENTED REALITY CONTENT IN A MESSAGING SYSTEM

BACKGROUND

With the increased use of digital images, affordability of portable computing devices, availability of increased capacity of digital storage media, and increased bandwidth and accessibility of network connections, digital images have become a part of the daily life for an increasing number of people.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which:

FIG. 9 illustrates example interfaces in accordance with various embodiments.

FIG. 10 illustrates example interfaces in accordance with various embodiments.

FIG. 11 illustrates example interfaces in accordance with various embodiments.

FIG. 13 illustrates example interfaces in accordance with various embodiments.

FIG. 14 illustrates example interfaces in accordance with various embodiments.

FIG. 15 illustrates example interfaces in accordance with various embodiments.

FIG. 16 illustrates example interfaces in accordance with various embodiments.

FIG. 17 illustrates example interfaces in accordance with various embodiments.

FIG. 20 illustrates example interfaces in accordance with various embodiments.

FIG. 26 is a flowchart illustrating a method, according to certain example embodiments.

DETAILED DESCRIPTION

Figure 1:
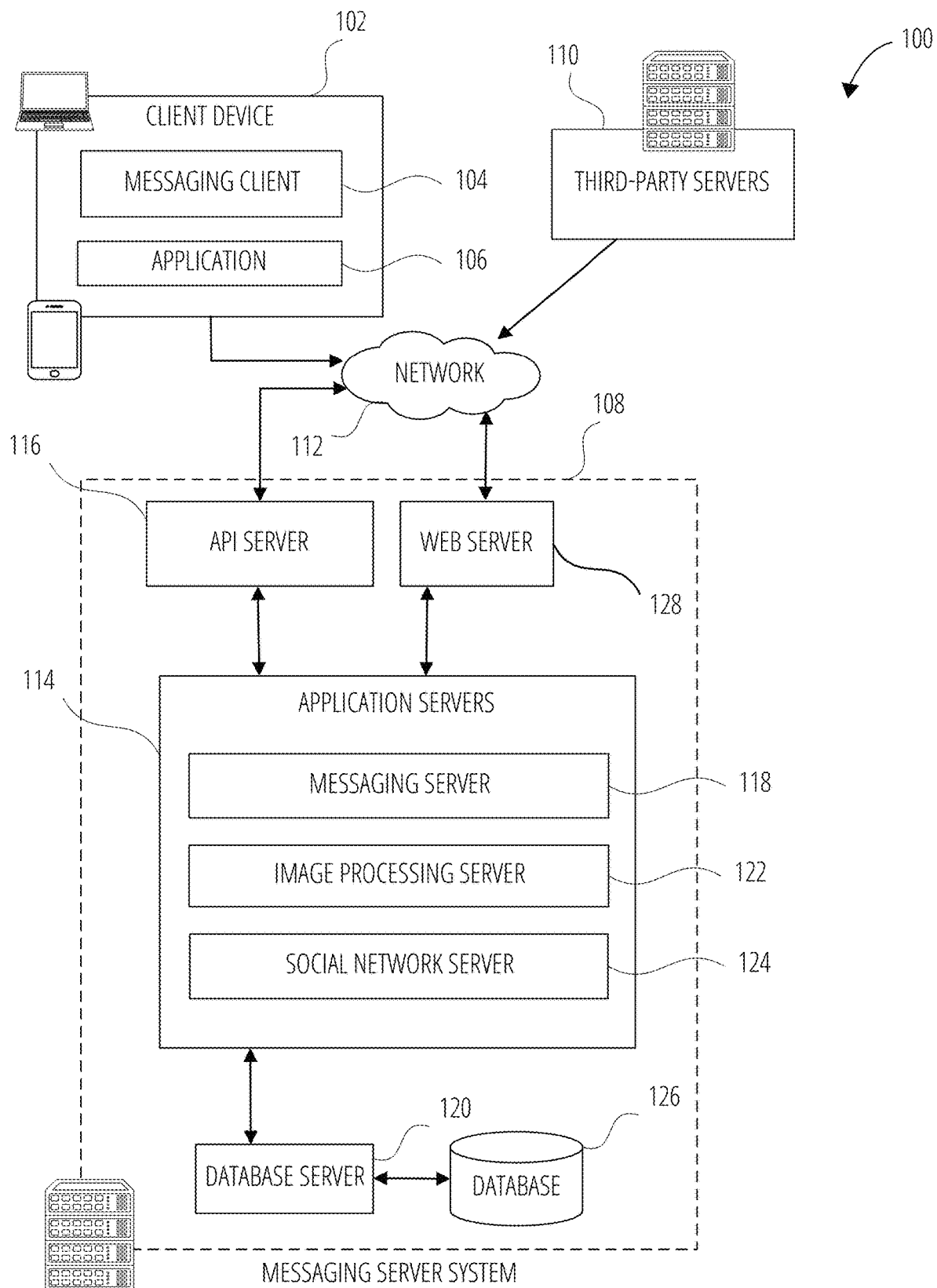
FIG. 1 is a diagrammatic representation of a networked environment in which the present disclosure may be deployed, in accordance with some examples.

Users with a range of interests from various locations can capture digital images of various subjects and make captured images available to others via networks, such as the Internet. To enhance users' experiences with digital images and provide various features, enabling computing devices to perform image processing operations on various objects and/or features captured in a wide range of changing conditions (e.g., changes in image scales, noises, lighting, movement, or geometric distortion) can be challenging and computationally intensive. Augmented reality technology aims to bridge a gap between virtual environments and a real world environment by providing an enhanced real world environment that is augmented with electronic information. As a result, the electronic information appears to be part of the real world environment as perceived by a user. In an example, augmented reality technology further provides a user interface to interact with the electronic information that is overlaid in the enhanced real world environment.

As mentioned above, with the increased use of digital images, affordability of portable computing devices, availability of increased capacity of digital storage media, and increased bandwidth and accessibility of network connections, digital images have become a part of the daily life for an increasing number of people. Users with a range of interests from various locations can capture digital images of various subjects and make captured images available to others via networks, such as the Internet. To enhance users' experiences with digital images and provide various features, enabling computing devices to perform image processing operations on various objects and/or features captured in a wide range of changing conditions (e.g., changes in image scales, noises, lighting, movement, or geometric distortion) can be challenging and computationally intensive.

Augmented reality technology aims to bridge a gap between virtual environments and a real world environment by providing an enhanced real world environment that is augmented with electronic information. As a result, the electronic information appears to be part of the real world environment as perceived by a user. In an example, augmented reality technology further provides a user interface to interact with the electronic information that is overlaid in the enhanced real world environment.

An augmented reality (AR) system enables real and virtual environments to be combined in varying degrees to facilitate interactions from a user in a real time manner. Such an AR system, as described herein, therefore can include various possible combinations of real and virtual environments, including augmented reality that primarily includes real elements and is closer to a real environment than a virtual environment (e.g., without real elements). In this manner, a real environment can be connected with a virtual environment by the AR system. A user immersed in an AR environment can navigate through such an environment and the AR system can track the user's viewpoint to provide a visualization based on how the user is situated in the environment. Augmented reality (AR) experiences can be provided in a messaging client application (or the messaging system) as described in embodiments herein.

Embodiments of the subject technology described herein enable various operations involving AR content for capturing and modifying such content with a given electronic device, such as a mobile computing device.

Messaging systems are frequently utilized and are increasingly leveraged by users of mobile computing devices, in various settings, to provide different types of functionality in a convenient manner. As described herein, the subject messaging system comprises practical applications that provide improvements in capturing image data and rendering AR content (e.g., images, videos, and the like) based on the captured image data by at least providing technical improvements with capturing image data using power and resource constrained electronic devices. Such improvements in capturing image data are enabled by techniques provided by the subject technology, which reduce latency and increase efficiency in processing captured image data thereby also reducing power consumption in the capturing devices.

As discussed further herein, the subject infrastructure supports the creation and sharing of interactive media, referred to herein as messages including 3D content or AR effects, throughout various components of a messaging system. In example embodiments described herein, messages can enter the system from a live camera or via from storage (e.g., where messages including 3D content and/or AR effects are stored in memory or a database). The subject system supports motion sensor input, and loading of external effects and asset data.

As referred to herein, the phrase "augmented reality experience," "augmented reality content item," "augmented reality content generator" includes or refers to various image processing operations corresponding to an image modification, filter, AR content generators, media overlay, transformation, and the like, and additionally can include playback of audio or music content during presentation of AR content or media content, as described further herein.

Networked Computing Environment

FIG. 1 is a block diagram showing an example messaging system 100 for exchanging data (e.g., messages and associated content) over a network. The messaging system 100 includes multiple instances of a client device 102, each of which hosts a number of applications, including a messaging client 104 and other applications 106. Each messaging client 104 is communicatively coupled to other instances of the messaging client 104 (e.g., hosted on respective other client devices 102), a messaging server system 108 and third-party servers 110 via a network 112 (e.g., the Internet). A messaging client 104 can also communicate with locally-hosted applications 106 using Applications Program Interfaces (APIs).

A messaging client 104 is able to communicate and exchange data with other messaging clients 104 and with the messaging server system 108 via the network 112. The data exchanged between messaging clients 104, and between a messaging client 104 and the messaging server system 108, includes functions (e.g., commands to invoke functions) as well as payload data (e.g., text, audio, video or other multimedia data).

The messaging server system 108 provides server-side functionality via the network 112 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 116 is coupled to, and provides a programmatic interface to, application servers 114. The application servers 114 are communicatively coupled to a database server 120, which facilitates access to a database 126 that stores data associated with messages processed by the application servers 114. Similarly, a web server 128 is coupled to the application servers 114, and provides web-based interfaces to the application servers 114. To this end, the web server 128 processes incoming network requests over the Hypertext Transfer Protocol (HTTP) and several other related protocols.

The Application Program Interface (API) server 116 receives and transmits message data (e.g., commands and message payloads) between the client device 102 and the application servers 114. Specifically, the Application Program Interface (API) server 116 provides a set of interfaces (e.g., routines and protocols) that can be called or queried by the messaging client 104 in order to invoke functionality of the application servers 114. The Application Program Interface (API) server 116 exposes various functions supported by the application servers 114, including account registration, login functionality, the sending of messages, via the application servers 114, from a particular messaging client 104 to another messaging client 104, the sending of media files (e.g., images or video) from a messaging client 104 to a messaging server 118, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 114 host a number of server applications and subsystems, including for example a messaging server 118, an image processing server 122, and a social network server 124. The messaging server 118 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor and memory intensive processing of data may also be performed server-side by the messaging server 118, in view of the hardware requirements for such processing.

The application servers 114 also include an image processing server 122 that is dedicated to performing various image processing operations, typically with respect to images or video within the payload of a message sent from or received at the messaging server 118.

Figure 3:
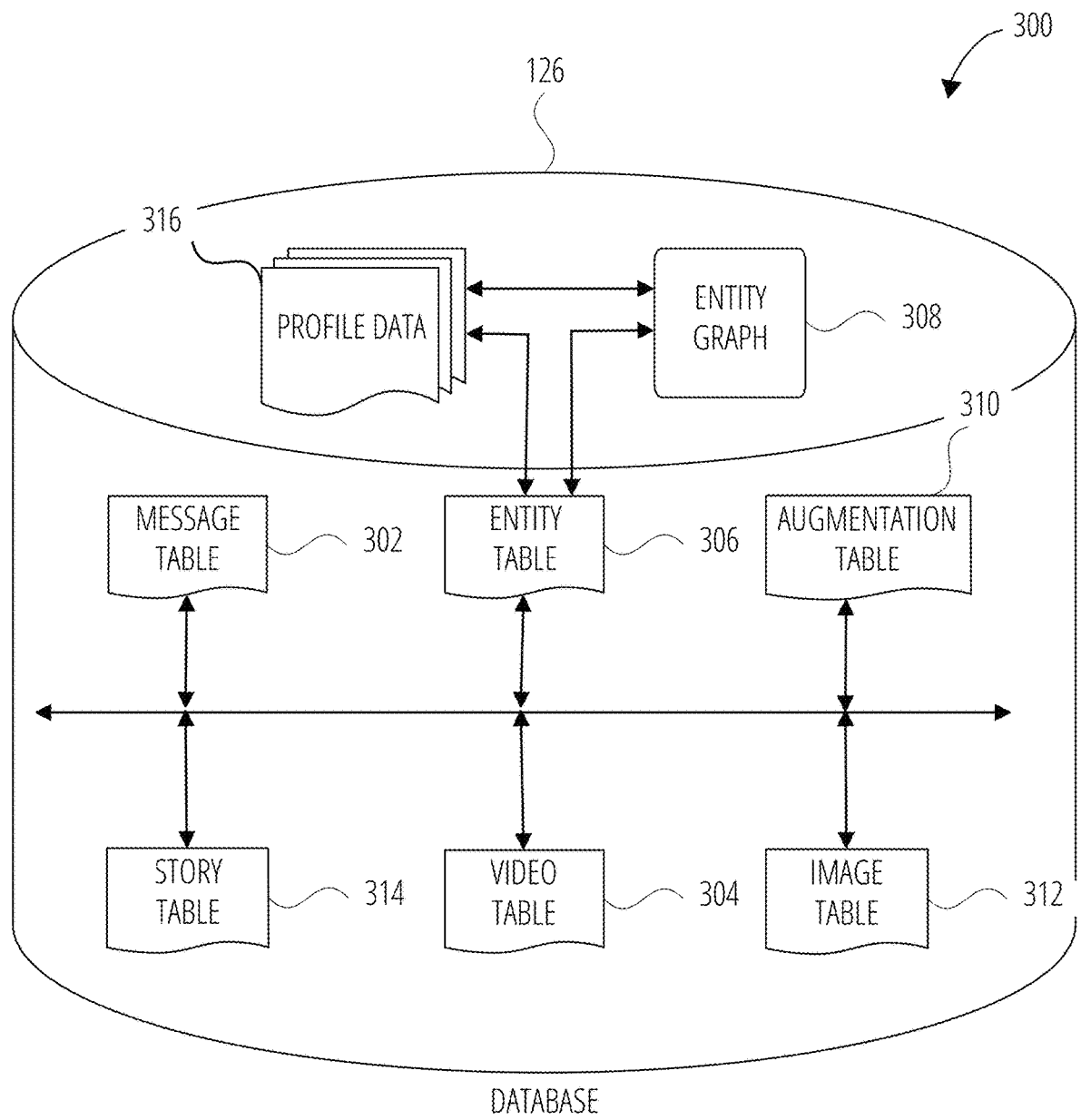
FIG. 3 is a diagrammatic representation of a data structure as maintained in a database, in accordance with some examples.

The social network server 124 supports various social networking functions and services and makes these functions and services available to the messaging server 118. To this end, the social network server 124 maintains and accesses an entity graph 308 (as shown in FIG. 3) within the database 126. Examples of functions and services supported by the social network server 124 include the identification of other users of the messaging system 100 with which a particular user has relationships or is "following," and also the identification of other entities and interests of a particular user.

Returning to the messaging client 104, features and functions of an external resource (e.g., an application 106 or applet) are made available to a user via an interface of the messaging client 104. In this context, "external" refers to the fact that the application 106 or applet is external to the messaging client 104. The external resource is often provided by a third party but may also be provided by the creator or provider of the messaging client 104. The messaging client 104 receives a user selection of an option to launch or access features of such an external resource. The external resource may be the application 106 installed on the client device 102 (e.g., a "native app"), or a small-scale version of the application (e.g., an "applet") that is hosted on the client device 102 or remote of the client device 102 (e.g., on third-party servers 110). The small-scale version of the application includes a subset of features and functions of the application (e.g., the full-scale, native version of the application) and is implemented using a markup-language document. In one example, the small-scale version of the application (e.g., an "applet") is a web-based, markup-language version of the application and is embedded in the messaging client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource, the messaging client 104 determines whether the selected external resource is a web-based external resource or a locally-installed application 106. In some cases, applications 106 that are locally installed on the client device 102 can be launched independently of and separately from the messaging client 104, such as by selecting an icon, corresponding to the application 106, on a home screen of the client device 102. Small-scale versions of such applications can be launched or accessed via the messaging client 104 and, in some examples, no or limited portions of the small-scale application can be accessed outside of the messaging client 104. The small-scale application can be launched by the messaging client 104 receiving, from a third-party server 110 for example, a markup-language document associated with the small-scale application and processing such a document.

In response to determining that the external resource is a locally-installed application 106, the messaging client 104 instructs the client device 102 to launch the external resource by executing locally-stored code corresponding to the external resource. In response to determining that the external resource is a web-based resource, the messaging client 104 communicates with the third-party servers 110 (for example) to obtain a markup-language document corresponding to the selected external resource. The messaging client 104 then processes the obtained markup-language document to present the web-based external resource within a user interface of the messaging client 104.

The messaging client 104 can notify a user of the client device 102, or other users related to such a user (e.g., "friends"), of activity taking place in one or more external resources. For example, the messaging client 104 can provide participants in a conversation (e.g., a chat session) in the messaging client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using respective messaging clients 104, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 104. The external resource can selectively include different media items in the responses, based on a current context of the external resource.

The messaging client 104 can present a list of the available external resources (e.g., applications 106 or applets) to a user to launch or access a given external resource. This list can be presented in a context-sensitive menu. For example, the icons representing different ones of the application 106 (or applets) can vary based on how the menu is launched by the user (e.g., from a conversation interface or from a non-conversation interface).

System Architecture

Figure 2:
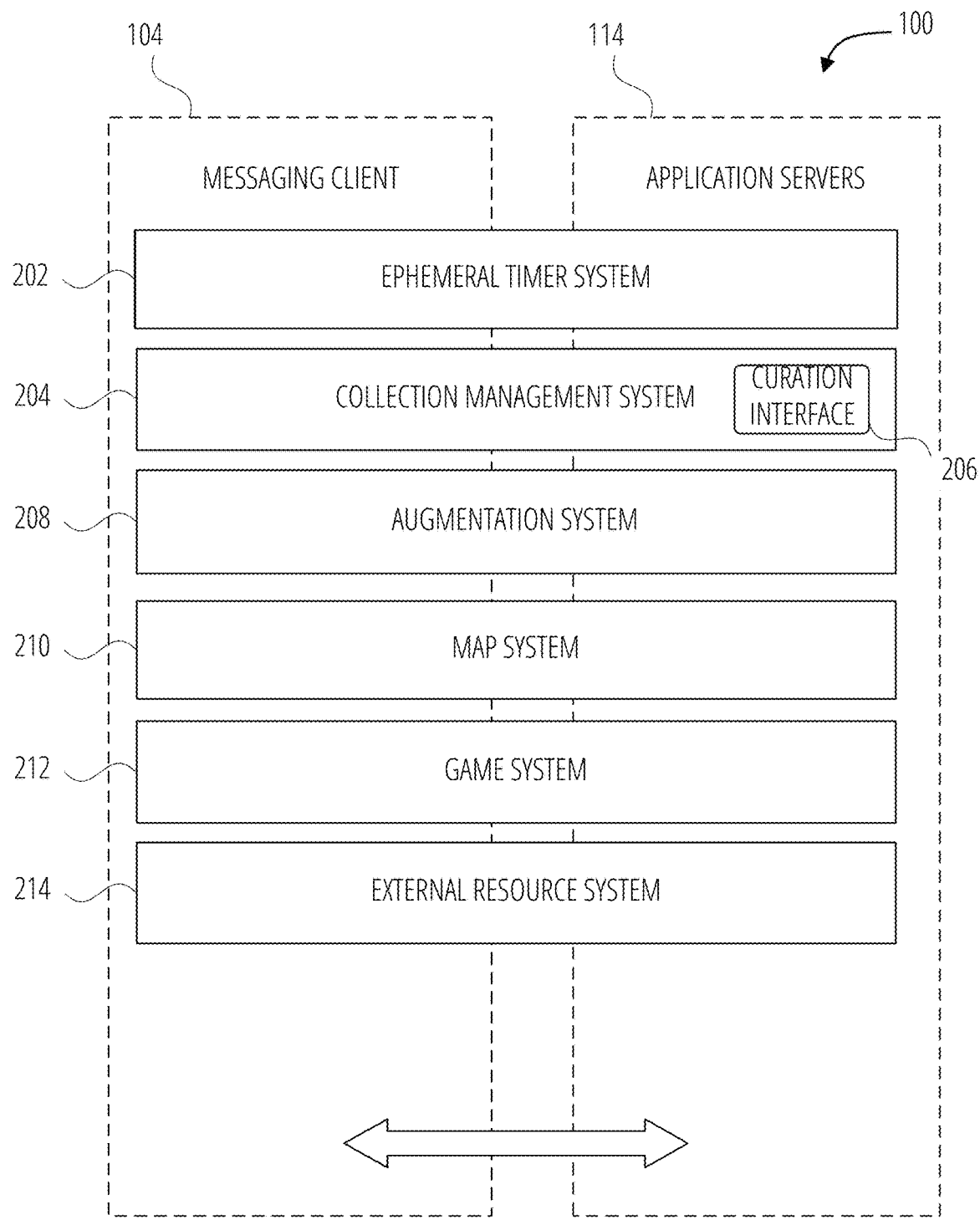
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 104 and the application servers 114. The messaging system 100 embodies a number of subsystems, which are supported on the client-side by the messaging client 104 and on the sever-side by the application servers 114. These subsystems include, for example, an ephemeral timer system 202, a collection management system 204, an augmentation system 208, a map system 210, a game system 212, and an external resource system 214.

The ephemeral timer system 202 is responsible for enforcing the temporary or time-limited access to content by the messaging client 104 and the messaging server 118. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter) to the messaging client 104 based on a geolocation of the client device 102. In another example, the augmentation system 208 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 208 uses the geolocation of the client device 102 to identify a media overlay that includes the name of a merchant at the geolocation of the client device 102. The media overlay may include other indicia associated with the merchant. The media overlays may be stored in the database 126 and accessed through the database server 120.

In some examples, the augmentation system 208 provides a user-based publication platform that enables users to select a geolocation on a map and upload content associated with the selected geolocation. The user may also specify circumstances under which a particular media overlay should be offered to other users. The augmentation system 208 generates a media overlay that includes the uploaded content and associates the uploaded content with the selected geolocation.

In other examples, the augmentation system 208 provides a merchant-based publication platform that enables merchants to select a particular media overlay associated with a geolocation via a bidding process. For example, the augmentation system 208 associates the media overlay of the highest bidding merchant with a corresponding geolocation for a predefined amount of time.

The map system 210 provides various geographic location functions, and supports the presentation of map-based media content and messages by the messaging client 104. For example, the map system 210 enables the display of user icons or avatars (e.g., stored in profile data 316) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 212 provides various gaming functions within the context of the messaging client 104. The messaging client 104 provides a game interface providing a list of available games that can be launched by a user within the context of the messaging client 104, and played with other users of the messaging system 100. The messaging system 100 further enables a particular user to invite other users to participate in the play of a specific game, by issuing invitations to such other users from the messaging client 104. The messaging client 104 also supports both the voice and text messaging (e.g., chats) within the context of gameplay, provides a leaderboard for the games, and also supports the provision of in-game rewards (e.g., coins and items).

The external resource system 214 provides an interface for the messaging client 104 to communicate with remote servers (e.g. third-party servers 110) to launch or access external resources, i.e. applications or applets. Each third-party server 110 hosts, for example, a markup language (e.g., HTML5) based application or small-scale version of an application (e.g., game, utility, payment, or ride-sharing application). The messaging client 104 may launches a web-based resource (e.g., application) by accessing the HTML5 file from the third-party servers 110 associated with the web-based resource. In certain examples, applications hosted by third-party servers 110 are programmed in JavaScript leveraging a Software Development Kit (SDK) provided by the messaging server 118. The SDK includes Application Programming Interfaces (APIs) with functions that can be called or invoked by the web-based application. In certain examples, the messaging server 118 includes a JavaScript library that provides a given external resource access to certain user data of the messaging client 104. HTML5 is used as an example technology for programming games, but applications and resources programmed based on other technologies can be used.

In order to integrate the functions of the SDK into the web-based resource, the SDK is downloaded by a third-party server 110 from the messaging server 118 or is otherwise received by the third-party server 110. Once downloaded or received, the SDK is included as part of the application code of a web-based external resource. The code of the web-based resource can then call or invoke certain functions of the SDK to integrate features of the messaging client 104 into the web-based resource.

The SDK stored on the messaging server 118 effectively provides the bridge between an external resource (e.g., applications 106 or applets and the messaging client 104. This provides the user with a seamless experience of communicating with other users on the messaging client 104, while also preserving the look and feel of the messaging client 104. To bridge communications between an external resource and a messaging client 104, in certain examples, the SDK facilitates communication between third-party servers 110 and the messaging client 104. In certain examples, a Web ViewJavaScriptBridge running on a client device 102 establishes two one-way communication channels between an external resource and the messaging client 104. Messages are sent between the external resource and the messaging client 104 via these communication channels asynchronously. Each SDK function invocation is sent as a message and callback. Each SDK function is implemented by constructing a unique callback identifier and sending a message with that callback identifier.

By using the SDK, not all information from the messaging client 104 is shared with third-party servers 110. The SDK limits which information is shared based on the needs of the external resource. In certain examples, each third-party server 110 provides an HTML5 file corresponding to the web-based external resource to the messaging server 118. The messaging server 118 can add a visual representation (such as a box art or other graphic) of the web-based external resource in the messaging client 104. Once the user selects the visual representation or instructs the messaging client 104 through a GUI of the messaging client 104 to access features of the web-based external resource, the messaging client 104 obtains the HTML5 file and instantiates the resources necessary to access the features of the web-based external resource.

The messaging client 104 presents a graphical user interface (e.g., a landing page or title screen) for an external resource. During, before, or after presenting the landing page or title screen, the messaging client 104 determines whether the launched external resource has been previously authorized to access user data of the messaging client 104. In response to determining that the launched external resource has been previously authorized to access user data of the messaging client 104, the messaging client 104 presents another graphical user interface of the external resource that includes functions and features of the external resource. In response to determining that the launched external resource has not been previously authorized to access user data of the messaging client 104, after a threshold period of time (e.g., 3 seconds) of displaying the landing page or title screen of the external resource, the messaging client 104 slides up (e.g., animates a menu as surfacing from a bottom of the screen to a middle of or other portion of the screen) a menu for authorizing the external resource to access the user data. The menu identifies the type of user data that the external resource will be authorized to use. In response to receiving a user selection of an accept option, the messaging client 104 adds the external resource to a list of authorized external resources and allows the external resource to access user data from the messaging client 104. In some examples, the external resource is authorized by the messaging client 104 to access the user data in accordance with an OAuth 2 framework.

The messaging client 104 controls the type of user data that is shared with external resources based on the type of external resource being authorized. For example, external resources that include full-scale applications (e.g., an application 106) are provided with access to a first type of user data (e.g., only two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

Data Architecture

FIG. 3 is a schematic diagram illustrating data structures 300, which may be stored in the database 126 of the messaging server system 108, according to certain examples. While the content of the database 126 is shown to comprise a number of tables, it will be appreciated that the data could be stored in other types of data structures (e.g., as an object-oriented database).

The database 126 includes message data stored within a message table 302. This message data includes, for any particular one message, at least message sender data, message recipient (or receiver) data, and a payload. Further details regarding information that may be included in a message, and included within the message data stored in the message table 302 is described below with reference to FIG. 4.

An entity table 306 stores entity data, and is linked (e.g., referentially) to an entity graph 308 and profile data 316. Entities for which records are maintained within the entity table 306 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 308 stores information regarding relationships and associations between entities. Such relationships may be social, professional (e.g., work at a common corporation or organization) interested-based or activity-based, merely for example.

The profile data 316 stores multiple types of profile data about a particular entity. The profile data 316 may be selectively used and presented to other users of the messaging system 100, based on privacy settings specified by a particular entity. Where the entity is an individual, the profile data 316 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 316 for the group may similarly include one or more avatar representations associated with the group, in addition to the group name, members, and various settings (e.g., notifications) for the relevant group.

The database 126 also stores augmentation data, such as overlays or filters, in an augmentation table 310. The augmentation data is associated with and applied to videos (for which data is stored in a video table 304) and images (for which data is stored in an image table 312).

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 312 includes augmented reality content items (e.g., corresponding to applying Lenses or augmented reality experiences). An augmented reality content item may be a real-time special effect and sound that may be added to an image or a video.

As described above, augmentation data includes augmented reality content items, overlays, image transformations, AR images, and similar terms refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 314 stores data regarding collections of messages and associated image, video, or audio data, which are compiled into a collection (e.g., a story or a gallery). The creation of a particular collection may be initiated by a particular user (e.g., each user for which a record is maintained in the entity table 306). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from varies locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 304 stores video data that, in one example, is associated with messages for which records are maintained within the message table 302. Similarly, the image table 312 stores image data associated with messages for which message data is stored in the entity table 306. The entity table 306 may associate various augmentations from the augmentation table 310 with various images and videos stored in the image table 312 and the video table 304.

Data Communications Architecture

Figure 4:
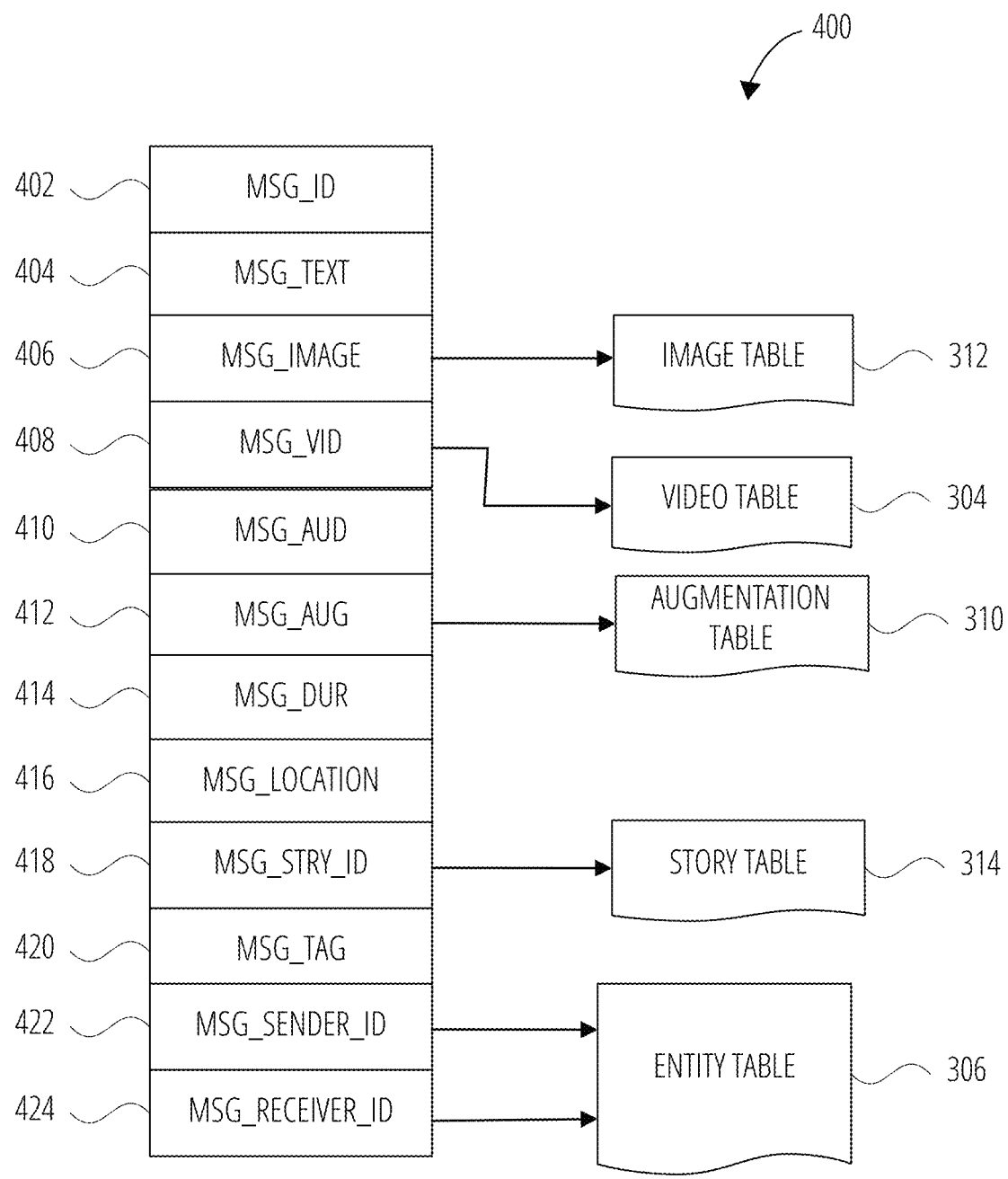
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 118. The content of a particular message 400 is used to populate the message table 302 stored within the database 126, accessible by the messaging server 118. Similarly, the content of a message 400 is stored in memory as "in-transit" or "in-flight" data of the client device 102 or the application servers 114. A message 400 is shown to include the following example components:

- message identifier 402: a unique identifier that identifies the message 400.
- message text payload 404: text, to be generated by a user via a user interface of the client device 102, and that is included in the message 400.
- message image payload 406: image data, captured by a camera component of a client device 102 or retrieved from a memory component of a client device 102, and that is included in the message 400. Image data for a sent or received message 400 may be stored in the image table 312.
- message video payload 408: video data, captured by a camera component or retrieved from a memory component of the client device 102, and that is included in the message 400. Video data for a sent or received message 400 may be stored in the video table 304.
- message audio payload 410: audio data, captured by a microphone or retrieved from a memory component of the client device 102, and that is included in the message 400.
- message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.
- message duration parameter 414: parameter value indicating, in seconds, the amount of time for which content of the message (e.g., the message image payload 406, message video payload 408, message audio payload 410) is to be presented or made accessible to a user via the messaging client 104.
- message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).
- message story identifier 418: identifier values identifying one or more content collections (e.g., "stories" identified in the story table 314) with which a particular content item in the message image payload 406 of the message 400 is associated. For example, multiple images within the message image payload 406 may each be associated with multiple content collections using identifier values.
- message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.
- message sender identifier 422: an identifier (e.g., a messaging system identifier, email address, or device identifier) indicative of a user of the Client device 102 on which the message 400 was generated and from which the message 400 was sent.
- message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 312. Similarly, values within the message video payload 408 may point to data stored within a video table 304, values stored within the message augmentations 412 may point to data stored in an augmentation table 310, values stored within the message story identifier 418 may point to data stored in a story table 314, and values stored within the message sender identifier 422 and the message receiver identifier 424 may point to user records stored within an entity table 306.

Figure 5:
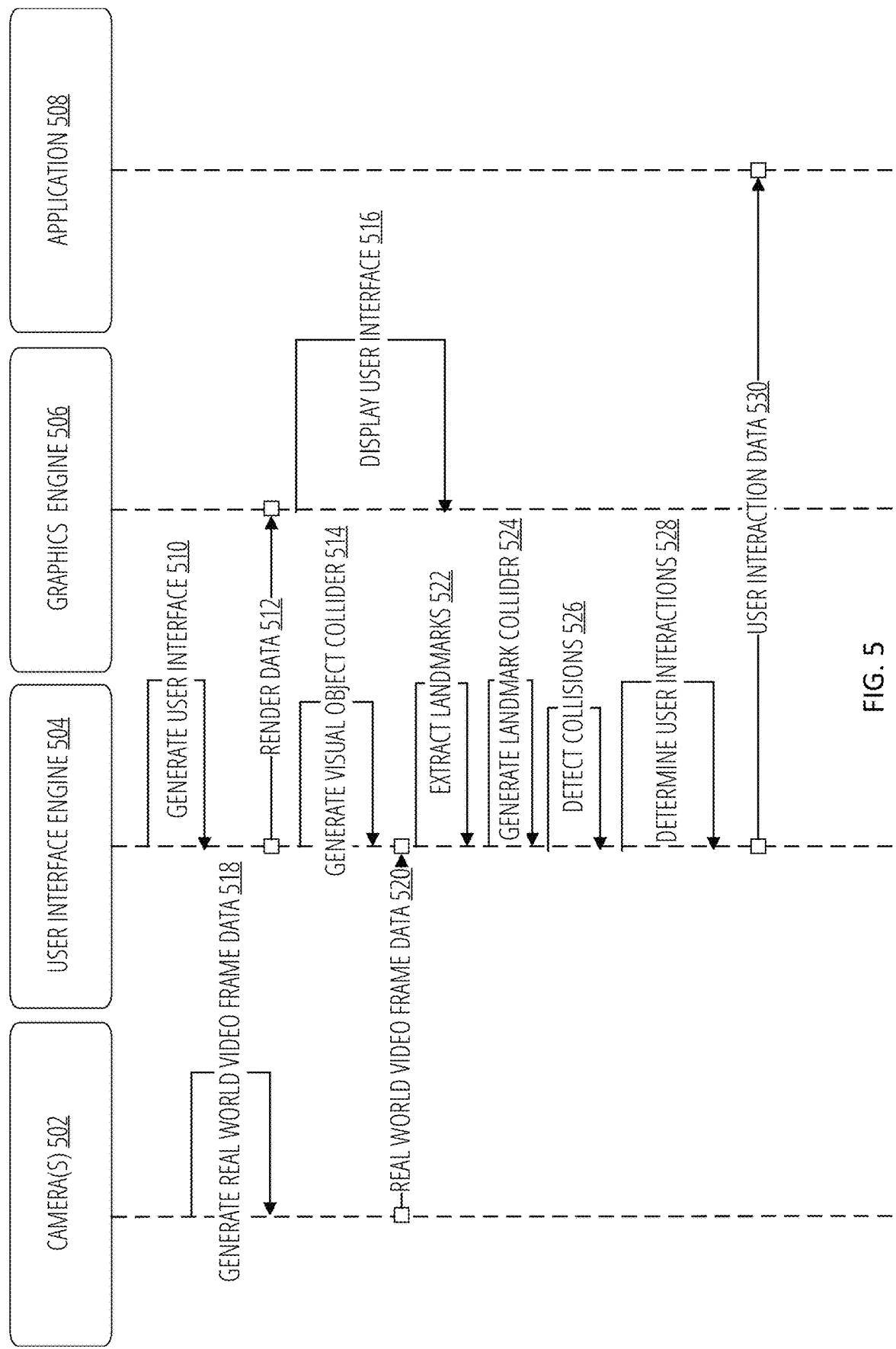
FIG. 5 illustrates a user interface generation and utilization process in accordance with some examples.

FIG. 5 depicts a sequence diagram of an example user interface process in accordance with some examples. During the process, a user interface engine 504 generates 510 the user interface including one or more virtual objects that constitute interactive elements of the user interface. A virtual object may be described as a solid in a 3D geometry having values in 3-tuples of X (horizontal), Y (vertical), and Z (depth). A render of the user interface is generated and render data 512 is communicated to a graphics engine 506 and displayed 516 to a user. The user interface engine 504 generates 514 one or more virtual object colliders for the one or more virtual objects. At least one camera 502 generates 518 real world video frame data 520 of the real world as viewed by the user. Included in the real world video frame data 520 is hand position video frame data of one or more of the user's hands within the render of the user interface by the graphics engine 506. Thus the real world video frame data 520 include hand location video frame data and hand position video frame data of the user's hands as the user makes movements with their hands.

As mentioned herein, a collider (e.g., virtual object collider) refers to a software construct that can be attached a particular area of the virtual object to enable tracking a location of the collider and detecting when a collision occurs between the collider and another virtual object (e.g., when the collider intersects with the other virtual object). In an example, when a second virtual object is attached with a collider, a collision event can be detected based on determining that a first collider of a first object has intersected the collider of the second virtual object. As discussed further herein, in response to detection of a collision event, user interface engine 504 can send user interaction data including such a collision event to a particular application (e.g., application 508) to enable the application to respond in a particular manner (e.g., perform a function or operation, and the like).

The user interface engine 504 utilizes the hand location video frame data and hand position video frame data in the real world video frame data 520 to extract landmarks 522 of the user's hands from the real world video frame data 520 and generates 524 landmark colliders for one or more landmarks on one or more of the user's hands. The landmark colliders are used to determine user interactions between the user and the virtual object by detecting collisions 526 between the landmark colliders and respective virtual object colliders of the virtual objects. The collisions are used by the user interface engine 504 to determine user interactions 528 by the user with the virtual objects. The user interface engine 504 communicates user interaction data 530 of the user interactions to an application 508 for utilization by the application 508.

In some examples, the application 508 performs the functions of the user interface engine 504 by utilizing various APIs and system libraries to receive and process the real world video frame data 520 and instruct the graphics engine 506 to perform a particular operation(s).

Although the above description relates to application 508, it is appreciated that in some embodiments, messaging client 104, application 106, or application 608 (discussed below) can perform the same operations as application 508.

Figure 6:
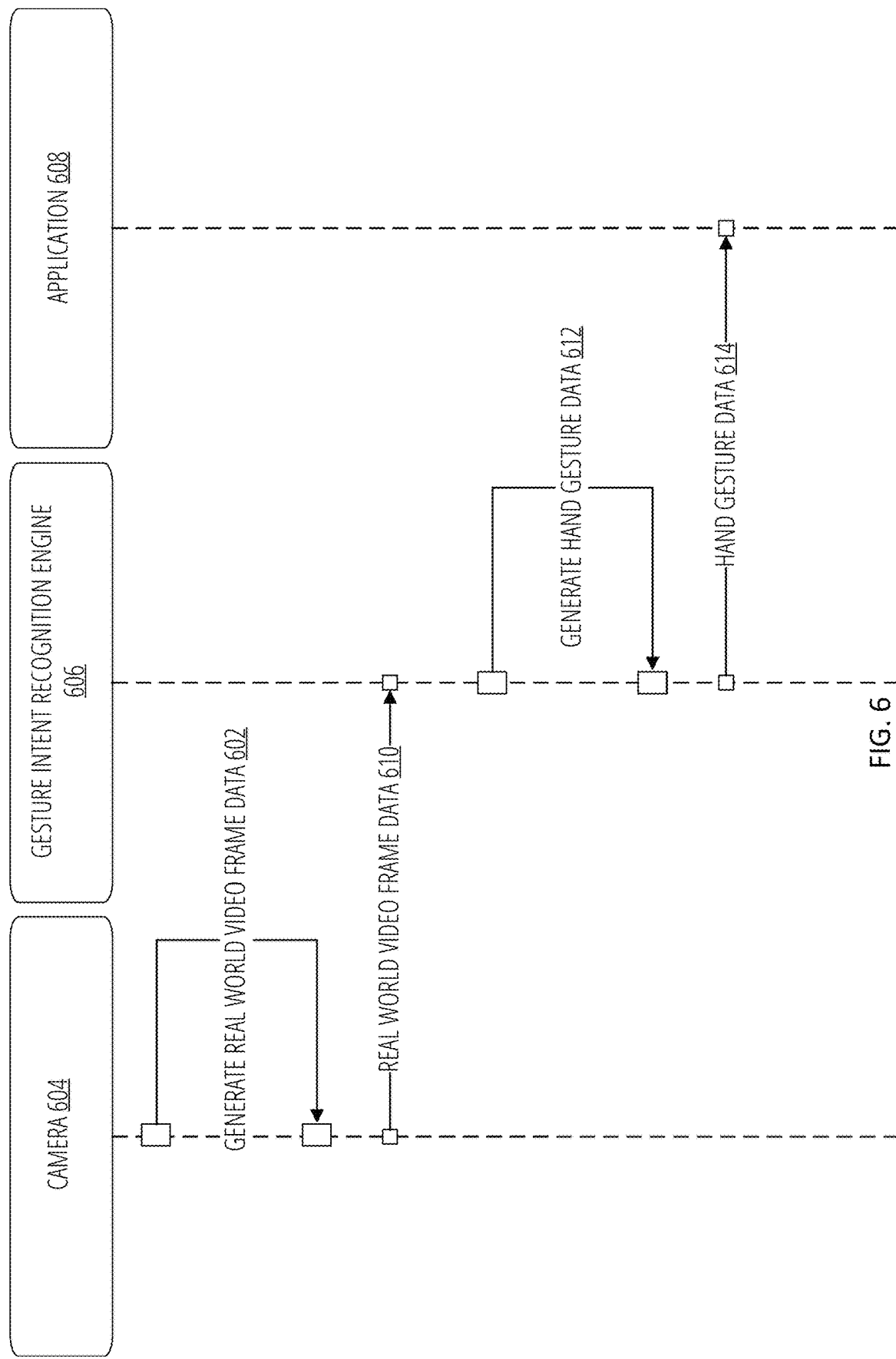
FIG. 6 depicts a sequence diagram of an example user interface process in accordance with some examples.

FIG. 6 depicts a sequence diagram of an example user interface process in accordance with some examples. At least one camera 604 generates 602 real world video frame data 610 of a real world as viewed by a user. In an example, the at least one camera 604 can be provided by a particular client device such as client device 102. Included in the real world video frame data 610 is hand position video frame data of one or more of the user's hands. Thus the real world video frame data 610 include hand location video frame data and hand position video frame data of the user's hands as the user makes movements with their hands. The gesture intent recognition engine 606 utilizes the hand location video frame data and hand position video frame data in the real world video frame data 610 to generate 612 hand gesture data 614 including hand gesture categorization information indicating one or more hand gestures being made by the user. The gesture intent recognition engine 606 communicates the hand gesture data 614 to an application 608 that utilized the hand gesture data 614 as an input from a user interface.

In some examples, the application 608 performs the functions of the gesture intent recognition engine 606 by utilizing various APIs and system libraries to receive and process the real world video frame data 610 from the at least one camera 604 to determine the hand gesture data 614.

Although the above description relates to application 608, it is appreciated that in some embodiments, messaging client 104, application 106, or application 508 can perform the same operations as application 608.

Moreover, it is appreciated that user interface engine 504 and graphics engine 506 discussed above in FIG. 5 can process hand gesture data 614 to perform similar operations discussed above in FIG. 5. For example, user interface engine 504 can generate render data for a user interface based at least in part on hand gesture data 614, and graphics engine 506 can render such a user interface for display using the generated render data.

Figure 7A:
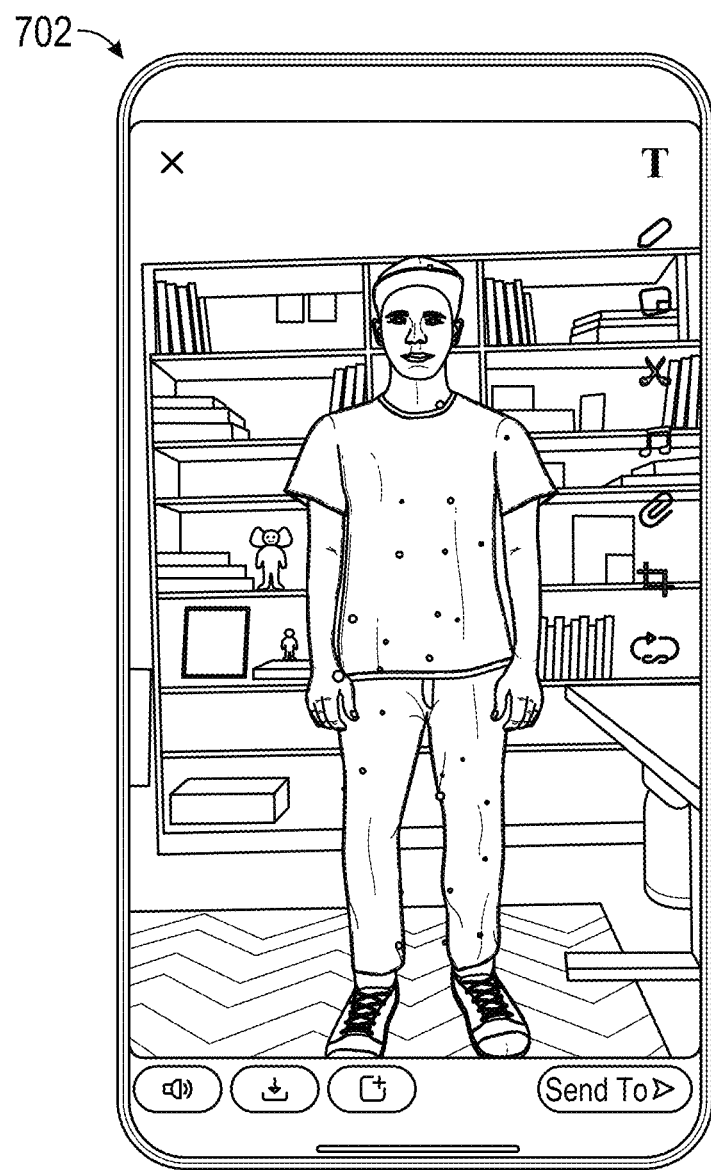
FIG. 7A illustrates an example interface in accordance with various embodiments.

FIG. 7A illustrates example interface in accordance with various embodiments. The example interface can be provided for display on a client device (e.g., the client device 102), such as through an interface(s) of the messaging client 104, application 106, application 608.

As shown, interface 702 includes a real world video frame data of the real world captured by camera 604. The real world video frame data includes one or more of the user's hands within a render of interface 702, and further includes hand location video frame data and hand position video frame data of the user's hands as the user makes movements with their hands.

As discussed before, gesture intent recognition engine 606 utilizes the hand location video frame data and hand position video frame data in the real world video frame data to generate hand gesture data including hand gesture categorization information indicating one or more hand gestures being made by the user. In an implementation, the gesture intent recognition engine 606 communicates the hand gesture data to an application that utilized the hand gesture data as an input from a user interface.

Figure 7B:
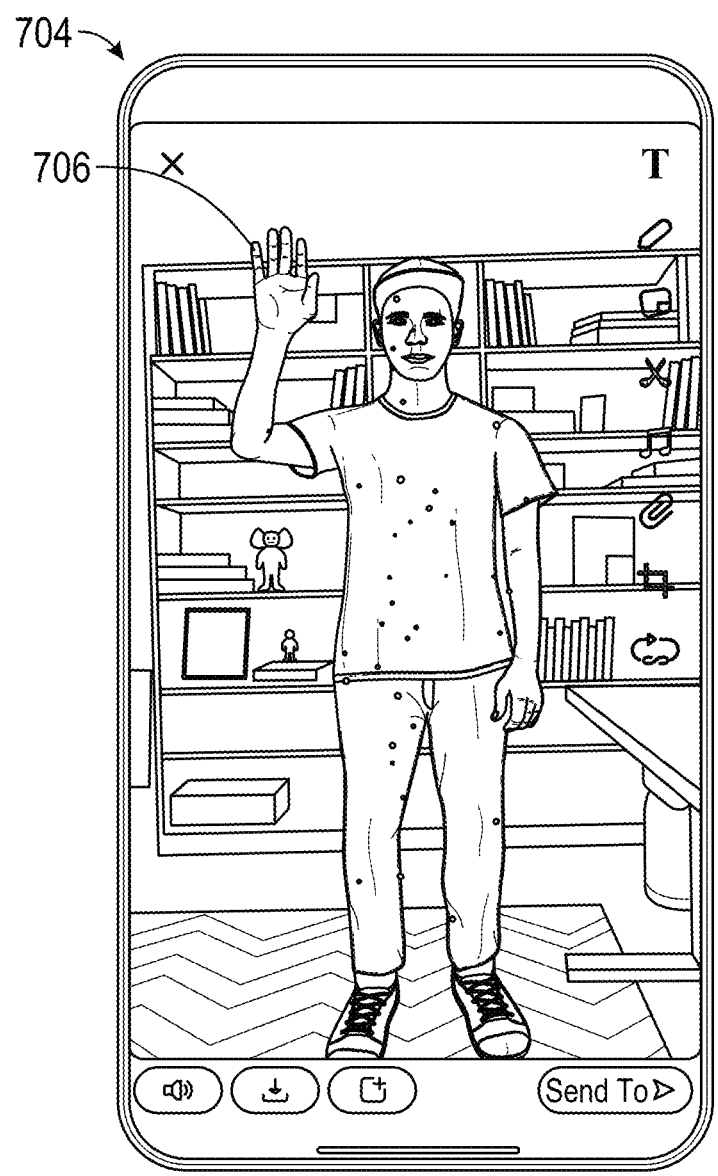
FIG. 7B illustrates an example interface in accordance with various embodiments.

FIG. 7B illustrates an example interface in accordance with various embodiments. The example interface can be provided for display on a client device (e.g., the client device 102), such as through an interface(s) of the messaging client 104, application 106, application 508, or application 608. The examples described in the following discussion of FIG. 7B are a continuation of the discussion above of FIG. 7A.

In the example of FIG. 7B, gesture intent recognition engine 606 analyzes real world video frame data shown in interface 704 to locate hand location video frame data and hand position video frame data of the user's hand as the user makes movements with their hand. In this example, the gesture intent recognition engine 606 utilizes the hand location video frame data and hand position video frame data in the real world video frame data to generate hand gesture data including hand gesture categorization information indicating a hand gesture being made by the user that indicates a gesture to either start or stop recording by camera 604. A start or stop recording gesture 706, as illustrated in FIG. 7B, corresponds to a gesture where the user's hand has been raised and has opened to show a palm of the hand. Thus, a start recording gesture corresponds to a first gesture of the aforementioned movements and positions and a stop recording gesture corresponds to a second gesture of the same movements and positions.

In some examples, the user can perform the start/stop recording gesture to position the palm of the user's hand over a selectable graphical item shown in interface 704. Such a selectable graphical item can be a graphical representation of a button such as a start recording button or a stop recording button, or can be textual information indicating as such (e.g., "start", "stop", and the like).

In an embodiment, application 608 (or messaging client 104, application 106, application 508) initiates recording upon determining a start recording gesture from the hand gesture data, and stops recording upon determining a stop recording gesture from the hand gesture data. In this fashion, a "hands-free" approach to starting or stopping recording can be provided where the user does not have to return to a client device and perform such actions on a screen of the client device (e.g., through a touch or tap gesture or input).

Figure 8:
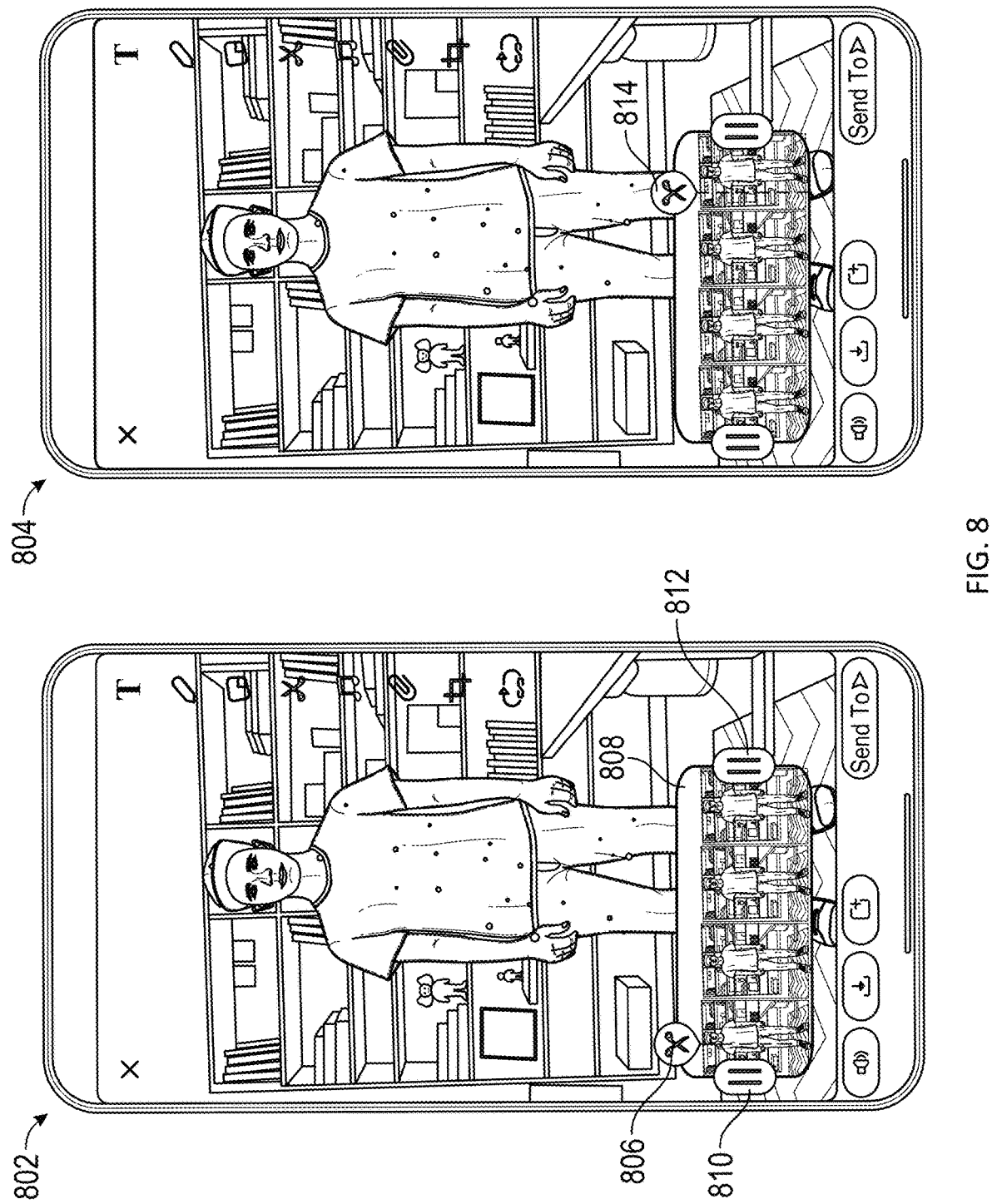
FIG. 8 illustrates example interfaces in accordance with various embodiments.

FIG. 8 illustrates example interfaces in accordance with various embodiments. The example interfaces can be provided for display on a client device (e.g., the client device 102), such as through an interface(s) of the messaging client 104, application 106, application 508, or application 608.

As illustrated, interface 802 provides a graphical item 806, graphical area 808, graphical item 810, and graphical item 812. In this example, graphical area 808 includes a set of frames corresponding to real world video frame data which are displayed as a timeline showing a chronological sequence of such frames. The graphical item 806 corresponds to a cut point where the real world video frame data can be trimmed (e.g., where frames after the cut point are truncated, discarded, or deleted) between a start point corresponding to graphical item 810 and an end point corresponding to graphical item 812.

As illustrated, interface 804 shows that graphical item 806 from interface 802 has been moved to later in the sequence of frames which corresponds to graphical item 814. Application 608 can perform a trimming operation to remove a second set of frames from a cut point corresponding to graphical item 814. In an embodiment, such a cut point is determined in an automated manner by application 608 based on determining a point within the sequence of frames corresponding to a frame indicating a start of a stop recording gesture, and then setting the cut point a threshold amount of frames before the frame indicating the start of the stop record gesture. In an implementation, the threshold amount of frames can be a predetermined number of frames such as five (5) frames, although it is understood that the number can be set to any number of frames. In an embodiment, the user can further adjust or modify the cut point moving the position of graphical item 814 by using touch inputs or gestures on the screen of the client device displaying interface 804.

Although the above description relates to application 608, it is appreciated that in some embodiments, messaging client 104, application 106, or application 508 can perform the same operations as application 608.

FIG. 9 illustrates example interfaces in accordance with various embodiments. The example interface can be provided for display on a client device (e.g., the client device 102), such as through an interface(s) of the messaging client 104, application 106, application 508, or application 608.

The examples of FIG. 9 illustrate embodiments for using a 2-D cursor to interact with other virtual objects.

As shown, interface 902 shows a real world video frame data of the real world captured by camera 502. The real world video frame data includes one or more of the user's hands within a render of interface 902 by the graphics engine 506, and further includes hand location video frame data and hand position video frame data of the user's hands as the user makes movements with their hands. Based on a location and position 910 of a representation of the user's finger in the real world video frame data, user interface engine 504 generates virtual object 912 corresponding to a cursor for interacting with other virtual objects rendered for display in interface 902.

In this example, user interface engine 504 enables the user to interact, using the virtual object 912, with a set of other virtual objects, including virtual object 914. The set of other virtual objects in this example are arranged in a grid-like configuration where each virtual object is positioned an equidistance amount of space between an adjacent virtual object(s). In an implementation, user interface engine 504 generates virtual object colliders for each of the virtual objects. In an implementation, user interface engine 504 restricts movements of the cursor, corresponding to virtual object 912, to one axis of control such as an x-axis (e.g., horizontal). As a result, virtual object 912 can only select one particular virtual object from the set of other virtual objects in interface 902 such as a virtual object from a single "row" as arranged in the example of FIG. 9. As shown, virtual object 912 corresponding to the cursor has selected virtual object 914 based on detecting a collision event where a first collider of virtual object 912 intersects with a second collider of the virtual object 914. In response to the collision event, user interface engine 504 can animate virtual object 914 in a particular manner and cause graphics engine 506 to render the interface 902 accordingly. Moreover, user interface engine 504 sends user interaction data, including data related to the collision event, to a particular application (e.g., application 508) where such an application can perform a function or operation in response to the collision event.

As shown in another example, a render of interface 904 by the graphics engine 506 illustrates a location and position 930 of the user's finger has changed from interface 902. Based on the changed location and position 910 of a representation of the user's finger in the real world video frame data, user interface engine 504 moves the cursor from the position and location in interface 902 to the position and location corresponding to virtual object 932 in interface 904. In interface 904, the cursor corresponding to virtual object 932 overlaps with virtual object 934 indicating a collision, and user interface engine 504 can animate virtual object 934 in response to detecting a collision event. Moreover, user interface engine 504 sends user interaction data, including data related to the collision event, to a particular application (e.g., application 508) where such an application can perform a function or operation in response to the collision event.

Although the above description relates to application 508, it is appreciated that in some embodiments, messaging client 104, application 106, or application 608 can perform the same operations as application 508.

FIG. 10 illustrates example interfaces in accordance with various embodiments. The example interface can be provided for display on a client device (e.g., the client device 102), such as through an interface(s) of the messaging client 104, application 106, application 508, or application 608. The examples described in FIG. 10 in the following discussion are a continuation of the discussion in FIG. 9 above.

The examples of FIG. 10 illustrate embodiments for using a 3-D cursor to interact with other virtual objects.

As shown, interface 1002 shows a real world video frame data of the real world captured by camera 502. The real world video frame data includes one or more of the user's hands within a render of interface 1002 by the graphics engine 506, and further includes hand location video frame data and hand position video frame data of the user's hands as the user makes movements with their hands. Based on a location and position 1010 of a representation of the user's finger in the real world video frame data, user interface engine 504 generates virtual object 1012 corresponding to a cursor for interacting with other virtual objects rendered for display in interface 1002.

In this example, user interface engine 504 enables the user to interact, using the virtual object 1012, with a set of other virtual objects, including virtual object 1014. The set of other virtual objects in this example are arranged in a grid-like configuration where each virtual object is positioned an equidistance amount of space between an adjacent virtual object(s). In an implementation, user interface engine 504 generates virtual object colliders for each of the virtual objects. In an implementation, user interface engine 504 restricts movements of the cursor, corresponding to virtual object 1012, to two axes (e.g., more than one axis) of control such as an x-axis (e.g., horizontal) and a y-axis (e.g., vertical). As a result, virtual object 1012 can select a particular virtual object from the set of other virtual objects in interface 1002 such as a virtual object from a upper "row" as arranged in the example of FIG. 10. As shown, virtual object 1012 corresponding to the cursor has selected virtual object 1014 based on detecting a collision event where a first collider of the virtual object 1012 intersects with a second collider of the virtual object 1014. In response to the collision event, user interface engine 504 can animate virtual object 1014 in a particular manner and cause graphics engine 506 to render the interface 1002 accordingly. Moreover, user interface engine 504 sends user interaction data, including data related to the collision event, to a particular application (e.g., application 508) where such an application can perform a function or operation in response to the collision event.

As shown in another example, a render of interface 1004 by the graphics engine 506 illustrates a location and position 1030 of the user's finger has changed from interface 902. Based on the changed location and position 910 of a representation of the user's finger in the real world video frame data, user interface engine 504 moves the cursor from the position and location in interface 1002 to the position and location corresponding to virtual object 1032 in interface 1004 in a lower row from virtual object 1014 previously selected. In interface 1004, the cursor corresponding to virtual object 1032 overlaps with virtual object 1034 indicating a collision, and user interface engine 504 can animate virtual object 1034 in response to detecting a collision event. Moreover, user interface engine 504 sends user interaction data, including data related to the collision event, to a particular application (e.g., application 508) where such an application can perform a function or operation in response to the collision event. For example, the function or operation can be a task related to navigation, games, creation, and the like.

Although the above description relates to application 508, it is appreciated that in some embodiments, messaging client 104, application 106, or application 608 can perform the same operations as application 508.

FIG. 11 illustrates example interfaces in accordance with various embodiments. The example interface can be provided for display on a client device (e.g., the client device 102), such as through an interface(s) of the messaging client 104, application 106, application 508, or application 608.

As shown, interface 1102 includes a real world video frame data of the real world captured by camera 502. The real world video frame data includes one or more of the user's hands within a render of interface 902 by the graphics engine 506, and further includes hand location video frame data and hand position video frame data of the user's hands as the user makes movements with their hands. Based on a location and position 1110 of a representation of the user's finger (e.g., thumb) and a second location and second position of a representation of the user's second finger (e.g., index finger) in the real world video frame data, user interface engine 504 detects a firearm-like or shooting hand sign.

A render of interface 1104 by the graphics engine 506 illustrates a location and position 1130 of the user's first finger (e.g., thumb) has changed from interface 1102. Based on the changed location and position of a representation of the user's finger in the real world video frame data, user interface engine 504 determines a direction that the user's second finger (e.g., index finger) is pointing at, and performs a ray casting technique to determine a vector or path for animating virtual objects (e.g., virtual bullets or lasers, and the like) to follow along from the user's second finger. As shown in this example, graphics engine 506 renders virtual object 1132 and virtual object 1134 in interface 1104 and animates these virtual objects to follow the path discussed above.

Figure 12:
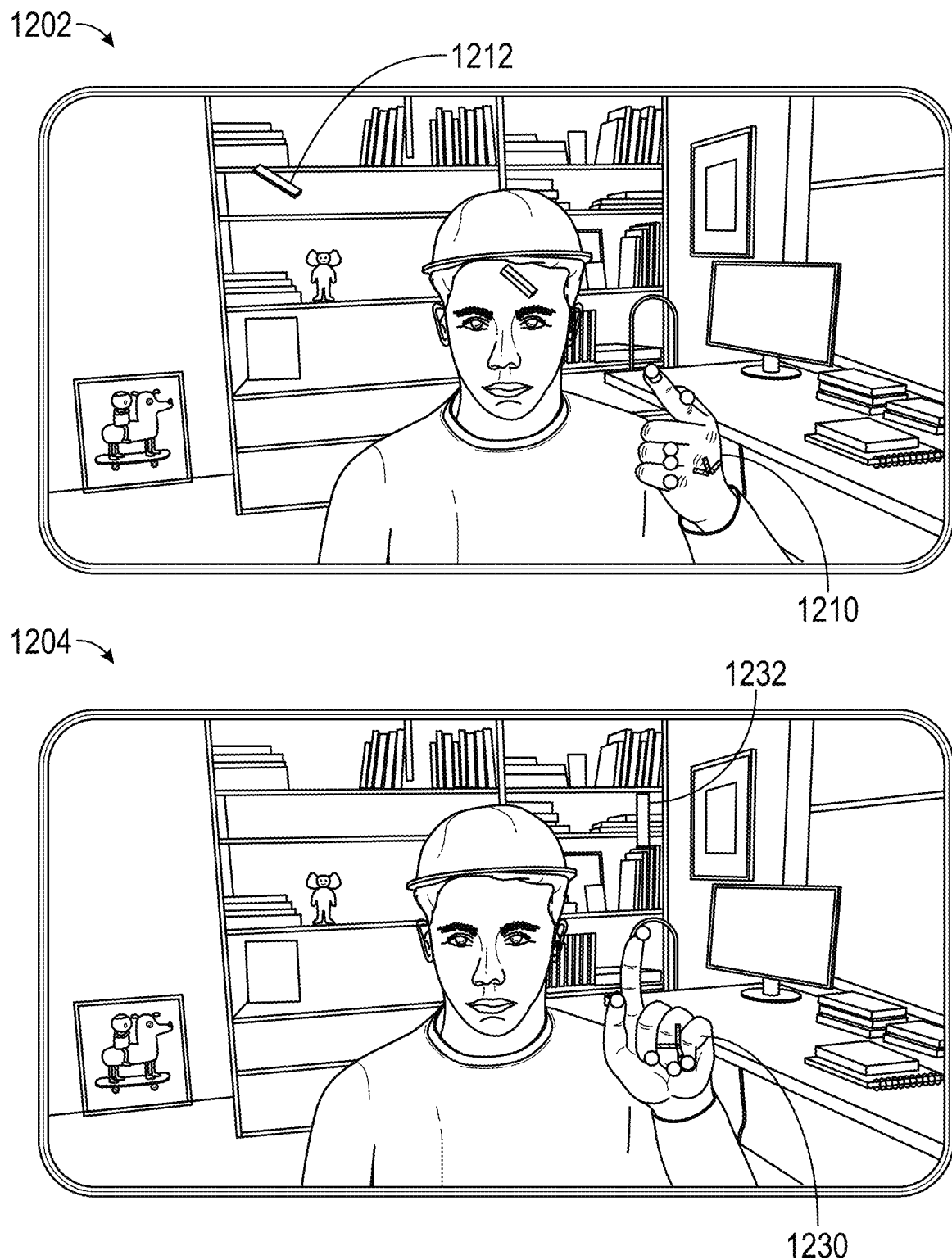
FIG. 12 illustrates example interfaces in accordance with various embodiments.

FIG. 12 illustrates example interfaces in accordance with various embodiments. The example interface can be provided for display on a client device (e.g., the client device 102), such as through an interface(s) of the messaging client 104, application 106, application 508, or application 608. The examples described in FIG. 12 below are a continuation of the discussion from FIG. 11.

As shown, interface 1202 includes a real world video frame data of the real world captured by camera 502. The real world video frame data includes one or more of the user's hands within a render of interface 1202 by the graphics engine 506, and further includes hand location video frame data and hand position video frame data of the user's hands as the user makes movements with their hands. Based on a location and position 1210 of a representation of the user's second finger (e.g., index finger) in the real world video frame data, user interface engine 504 detects that the location and position of the user's second finger changed from interface 1102.

After this detection, user interface engine 504 determines a direction that the user's second finger (e.g., index finger) is pointing at, and performs a ray casting technique to determine a vector or path for animating virtual objects (e.g., virtual bullets or lasers, and the like) to follow along from the user's first finger. As shown in this example, graphics engine 506 renders virtual object 1212 in interface 1202 and animates this virtual object to follow the path discussed above.

A render of interface 1204 by the graphics engine 506 illustrates a location and position 1230 of the user's second finger (e.g., index finger) has changed from interface 1202. Based on the changed location and position of a representation of the user's second finger in the real world video frame data, user interface engine 504 determines a new direction that the user's second finger (e.g., index finger) is pointing at, and performs a ray casting technique to determine a vector or path for animating virtual objects to follow along from the user's second finger. As shown in this example, graphics engine 506 renders virtual object 1232 in interface 1204 and animates this virtual object to follow the path discussed above.

FIG. 13 illustrates example interfaces in accordance with various embodiments. The example interface can be provided for display on a client device (e.g., the client device 102), such as through an interface(s) of the messaging client 104 or application 106.

As shown, interface 1302 includes a real world video frame data of the real world captured by camera 502. The real world video frame data includes one or more of the user's hands within a render of interface 1302 by the graphics engine 506, and further includes hand location video frame data and hand position video frame data of the user's hands as the user makes movements with their hands. Based on a location and position 1310 of a representation of the user's finger (e.g., thumb) and a second location and second position of a representation of the user's second finger (e.g., index finger) in the real world video frame data, user interface engine 504 generates virtual object 1312 corresponding to a cursor for interacting with other virtual objects rendered for display in interface 1102. As further shown, user interface engine 504 generates virtual object 1314 and virtual object 1316. A closer view of the user's hand is shown in graphical area 1318. In an embodiment, graphical area 1318 is hidden from interface 1302 or not displayed in interface 1302.

As shown, virtual object 1312 corresponding to the cursor has selected virtual object 1316 based on detecting a collision event where a first collider of virtual object 1312 intersects with a second collider of the virtual object 1316. In response to the collision event, user interface engine 504 can attach virtual object 1316 to virtual object 1312 and cause graphics engine 506 to render these two virtual objects accordingly (e.g., to appear connected to each other). In this example, virtual object 1316 is a slider control that enables selection of a particular color from a color palette represented by virtual object 1314, including changing of the selected color depending on the position of virtual object 1316 with respect to the color palette. In particular, a selected color is displayed in the interior of virtual object 1316.

A render of interface 1304 by the graphics engine 506 illustrates a location and position 1330 of the user's first finger (e.g., thumb) and virtual object 1332 have changed from interface 1302. In response to the changed location and position of the user's first finger (e.g., thumb is now "closed" or adjacent to the second finger), user interface engine 504 sends user interaction data, including data related to the collision event, to a particular application (e.g., application 508) where such an application can perform a function or operation in response to the collision event (e.g., activate a function such as a color selection corresponding to the position of virtual object 1316 in the color palette provided by virtual object 1314). In this example, virtual object 1336 is the same object as virtual object 1316 and virtual object 1332 is the same object as virtual object 1312, each of which having a different position from the previous position in interface 1302. A closer view of the user's hand is shown in graphical area 1338.

In response to the changed location and position 1330 of the user's hand, graphics engine 506 renders virtual object 1336 and virtual object 1332 in interface 1304 in a slightly different position than the previous position of virtual object 1316 and virtual object 1312 in interface 1302 which results in a different color selection from the color palette than the color shown in virtual object 1316 in interface 1302.

Although the above examples in FIG. 13 discuss the user's first finger (e.g., thumb is acting as a trigger when "closed" or next to a second finger) as causing the selection using virtual object 1336, in some embodiments another finger (e.g., index finger) can act as the "trigger" finger for causing a selection or initiating some functionality or operation.

FIG. 14 illustrates example interfaces in accordance with various embodiments. The example interface can be provided for display on a client device (e.g., the client device 102), such as through an interface(s) of the messaging client 104, application 106, application 508, or application 608. The examples described in FIG. 14 below are a continuation of the discussion from FIG. 13.

A render of interface 1402 by the graphics engine 506 illustrates a location and position 1410 of the user's hand and virtual object 1412 have changed from interface 1304. In response to the changed location and position 1410 of the user's hand and virtual object 1412, graphics engine 506 renders virtual object 1416 and virtual object 1412 in interface 1402 in a different position than the previous position of virtual object 1336 and virtual object 1332 in interface 1304 which results in a different color selection from the color palette than the color shown in virtual object 1336 in interface 1304. A closer view of the user's hand is shown in graphical area 1418.

In response to the changed location and position of the user's hand, user interface engine 504 sends user interaction data to perform a color selection. In this example, virtual object 1416 is the same object as virtual object 1336 and virtual object 1412 is the same object as virtual object 1332, each of which having a different position from the previous position in interface 1304.

A render of interface 1404 by the graphics engine 506 illustrates a location and position 1430 of the user's hand has changed from interface 1402. In response to the changed location and position 1430 of the user's hand, graphics engine 506 renders virtual object 1436 and virtual object 1432 in interface 1404 in a different position than the previous position of virtual object 1416 and virtual object 1412 in interface 1402 which results in a different color selection from the color palette than the color shown in virtual object 1416 in interface 1402. A closer view of the user's hand is shown in graphical area 1438.

In response to the changed location and position of the user's hand, user interface engine 504 sends user interaction data to perform a color selection. In this example, virtual object 1436 is the same object as virtual object 1416 and virtual object 1432 is the same object as virtual object 1412, each of which having a different position from the previous position in interface 1402.

FIG. 15 illustrates example interfaces in accordance with various embodiments. The example interface can be provided for display on a client device (e.g., the client device 102), such as through an interface(s) of the messaging client 104, application 106, application 508, or application 608. The examples described in FIG. 15 below are a continuation of the discussion from FIG. 14.

A render of interface 1502 by the graphics engine 506 illustrates a location and position 1510 of the user's hand and virtual object 1512 have changed from interface 1404. In response to the changed location and position 1510 of the user's hand and virtual object 1512, graphics engine 506 renders virtual object 1516 and virtual object 1512 in interface 1502 in a different position than the previous position of virtual object 1436 and virtual object 1432 in interface 1404 which results in a different color selection from the color palette than the color shown in virtual object 1436 in interface 1404. A closer view of the user's hand is shown in graphical area 1518.

In response to the changed location and position of the user's hand, user interface engine 504 sends user interaction data to perform a color selection. In this example, virtual object 1516 is the same object as virtual object 1436 and virtual object 1512 is the same object as virtual object 1432, each of which having a different position from the previous position in interface 1404.

A render of interface 1504 by the graphics engine 506 illustrates a location and position 1530 of the user's first finger (e.g., thumb) has changed from interface 1502. In response to the changed location and position 1430 of the user's first finger, user interface engine 504 sends user interaction data to perform a final color selection from the color palette coinciding with the color shown in virtual object 1516 in interface 1502. A closer view of the user's hand is shown in graphical area 1538.

FIG. 16 illustrates example interfaces in accordance with various embodiments. The example interface can be provided for display on a client device (e.g., the client device 102), such as through an interface(s) of the messaging client 104, application 106, application 508, or application 608.

As shown, interface 1602 includes a real world video frame data of the real world captured by camera 604. The real world video frame data includes one or more of the user's hands within a render of interface 1602, and further includes hand location video frame data and hand position video frame data of the user's hands as the user makes movements with their hands. As further shown, interface 1602 includes virtual object 1614 which can be manipulated using various gestures. A render of interface 1602 illustrates a location and position 1610 of the user's first hand and a location and position 1612 of the user's second hand.

As discussed before, gesture intent recognition engine 606 utilizes the hand location video frame data and hand position video frame data in the real world video frame data to generate hand gesture data including hand gesture categorization information indicating one or more hand gestures being made by the user. In an implementation, the gesture intent recognition engine 606 communicates the hand gesture data to an application that utilized the hand gesture data as an input from a user interface. Such hand gesture data discussed in the examples of FIG. 16, FIG. 17, and FIG. 18 include data for both of the user's hands such that gesture intent recognition engine 606 is enabled to recognize multi-gesture movements involving both hands.

In the example of FIG. 16, the hand gesture data indicates that virtual object 1614 is to be selected for interacting and responding to the user's hand movements. Such a virtual object be utilized by the application for performing a set of operations based at least in part on the location and position of the virtual object including a size of the object.

As further shown, interface 1604 includes location and position 1630 of the user's first hand and a location and position 1632 of the user's second hand which have changed (e.g., each thumb on each hand as been closed or brought closer to the index finger), and gesture intent recognition engine 606 utilizes the hand location video frame data and hand position video frame data to generate updated hand gesture data. In this other example of FIG. 16, the updated hand gesture data indicates that virtual object 1614 is expanded to be a larger size, which is shown as virtual object 1634 in the render of interface 1604.

FIG. 17 illustrates example interfaces in accordance with various embodiments. The example interface can be provided for display on a client device (e.g., the client device 102), such as through an interface(s) of the messaging client 104, application 106, application 508, or application 608. The examples described in FIG. 17 below are a continuation of the discussion from FIG. 16.

As shown, interface 1702 includes location and position 1710 of the user's first hand and a location and position 1712 of the user's second hand which have changed, and gesture intent recognition engine 606 utilizes the hand location video frame data and hand position video frame data to generate updated hand gesture data. In this example of FIG. 17, the updated hand gesture data indicates that virtual object 1634 from FIG. 16 is rotated in a particular direction, which is shown as virtual object 1714 in the render of interface 1702.

As further shown, interface 1704 includes location and position 1730 of the user's first hand and a location and position 1732 of the user's second hand which have changed, and gesture intent recognition engine 606 utilizes the hand location video frame data and hand position video frame data to generate updated hand gesture data. In this other example of FIG. 17, the updated hand gesture data indicates that virtual object 1714 is rotated in a different direction than in interface 1702, which is shown as virtual object 1734 in the render of interface 1704.

Figure 18:
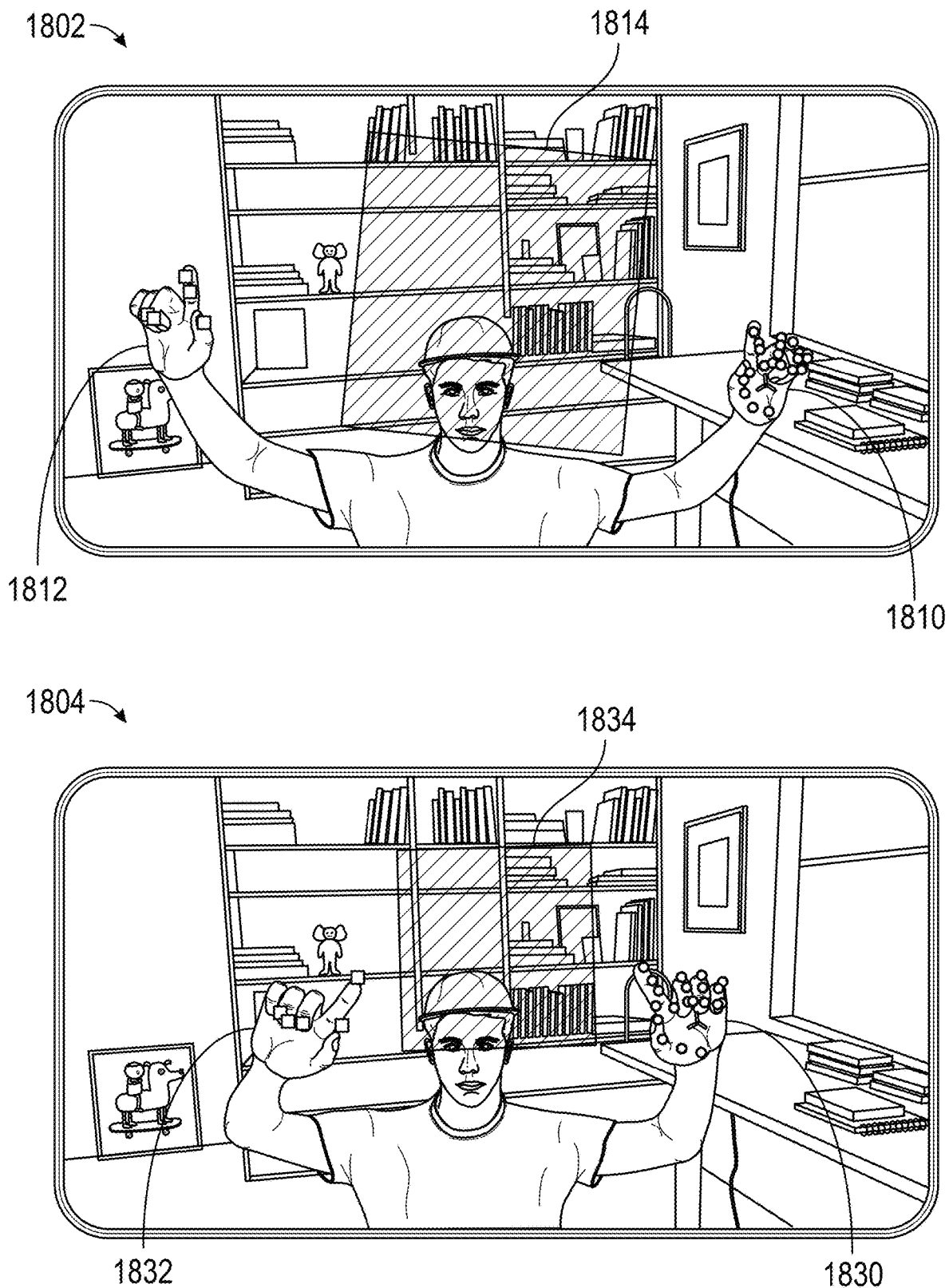
FIG. 18 illustrates example interfaces in accordance with various embodiments.

FIG. 18 illustrates example interfaces in accordance with various embodiments. The example interface can be provided for display on a client device (e.g., the client device 102), such as through an interface(s) of the messaging client 104, application 106, application 508, or application 608. The examples described in FIG. 18 below are a continuation of the discussion from FIG. 17.

As shown, interface 1802 includes location and position 1810 of the user's first hand and a location and position 1812 of the user's second hand which have changed, and gesture intent recognition engine 606 utilizes the hand location video frame data and hand position video frame data to generate updated hand gesture data. In this example of FIG. 18, the updated hand gesture data indicates that virtual object 1734 from FIG. 17 is expanded in overall size, which is shown as virtual object 1814 in the render of interface 1802.

As further shown, interface 1804 includes location and position 1830 of the user's first hand and a location and position 1832 of the user's second hand which have changed, and gesture intent recognition engine 606 utilizes the hand location video frame data and hand position video frame data to generate updated hand gesture data. In this other example of FIG. 18, the updated hand gesture data indicates that virtual object 1814 is to be reduced in overall size in interface 180202, which is shown as virtual object 1834 in the render of interface 1804.

Figure 19:
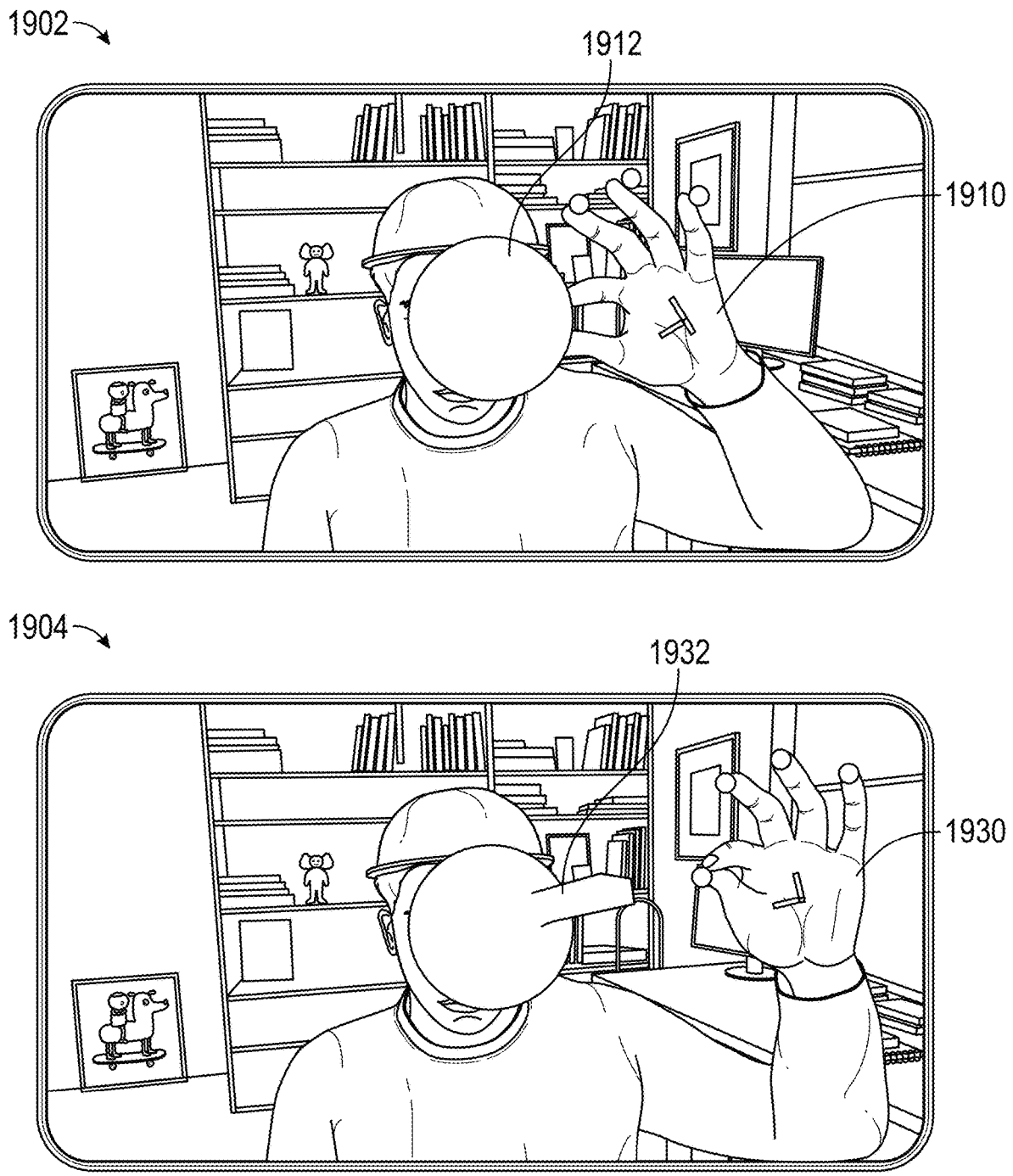
FIG. 19 illustrates example interfaces in accordance with various embodiments.

FIG. 19 illustrates example interfaces in accordance with various embodiments. The example interface can be provided for display on a client device (e.g., the client device 102), such as through an interface(s) of the messaging client 104, application 106, application 508, or application 608.

As shown, interface 1902 includes a real world video frame data of the real world captured by camera 604. The real world video frame data includes one or more of the user's hands within a render of interface 1902, and further includes hand location video frame data and hand position video frame data of the user's hands as the user makes movements with their hands. As further shown, interface 1902 includes virtual object 1912 which can be manipulated using various gestures. A render of interface 1902 illustrates a location and position 1910 of the user's first hand.

As discussed before, gesture intent recognition engine 606 utilizes the hand location video frame data and hand position video frame data in the real world video frame data to generate hand gesture data including hand gesture categorization information indicating one or more hand gestures being made by the user. In an implementation, the gesture intent recognition engine 606 communicates the hand gesture data to an application that utilized the hand gesture data as an input from a user interface.

In the example of FIG. 19, the hand gesture data indicates that a portion of the virtual object 1912 is to be selected as a starting point for modifying virtual object 912 based at least in part on the user's hand movements. Such a virtual object be utilized by the application for performing a set of operations based at least in part on the location and position of the virtual object including other characteristics of the object.

As further shown, interface 1904 includes location and position 1930 of the user's first hand has changed, and gesture intent recognition engine 606 utilizes the hand location video frame data and hand position video frame data to generate updated hand gesture data. In this other example of FIG. 19, the updated hand gesture data indicates that virtual object 1912 is to be modified, which is shown as virtual object 1932 in the render of interface 1904 where virtual object 1932 includes additional graphical data that has extended from the starting point from interface 1902.

FIG. 20 illustrates example interfaces in accordance with various embodiments. The example interface can be provided for display on a client device (e.g., the client device 102), such as through an interface(s) of the messaging client 104, application 106, application 508, or application 608. The examples described in FIG. 20 below are a continuation of the discussion from FIG. 19.

As shown, interface 2002 includes location and position 2010 of the user's first hand which has changed, and gesture intent recognition engine 606 utilizes the hand location video frame data and hand position video frame data to generate updated hand gesture data. In this example of FIG. 20, the updated hand gesture data indicates a second portion of virtual object 1932 is selected as a starting point for modifying virtual object 1932 based at least in part on the user's hand movements, which is shown as virtual object 2012 in the render of interface 2002.

As further shown, interface 2004 includes location and position 2030 of the user's first hand has changed, and gesture intent recognition engine 606 utilizes the hand location video frame data and hand position video frame data to generate updated hand gesture data. In this other example of FIG. 20, the updated hand gesture data indicates that virtual object 2012 is to be modified, which is shown as virtual object 2032 in the render of interface 2004 where virtual object 2032 includes second additional graphical data that has extended from the second starting point from interface 2002.

Figure 21:
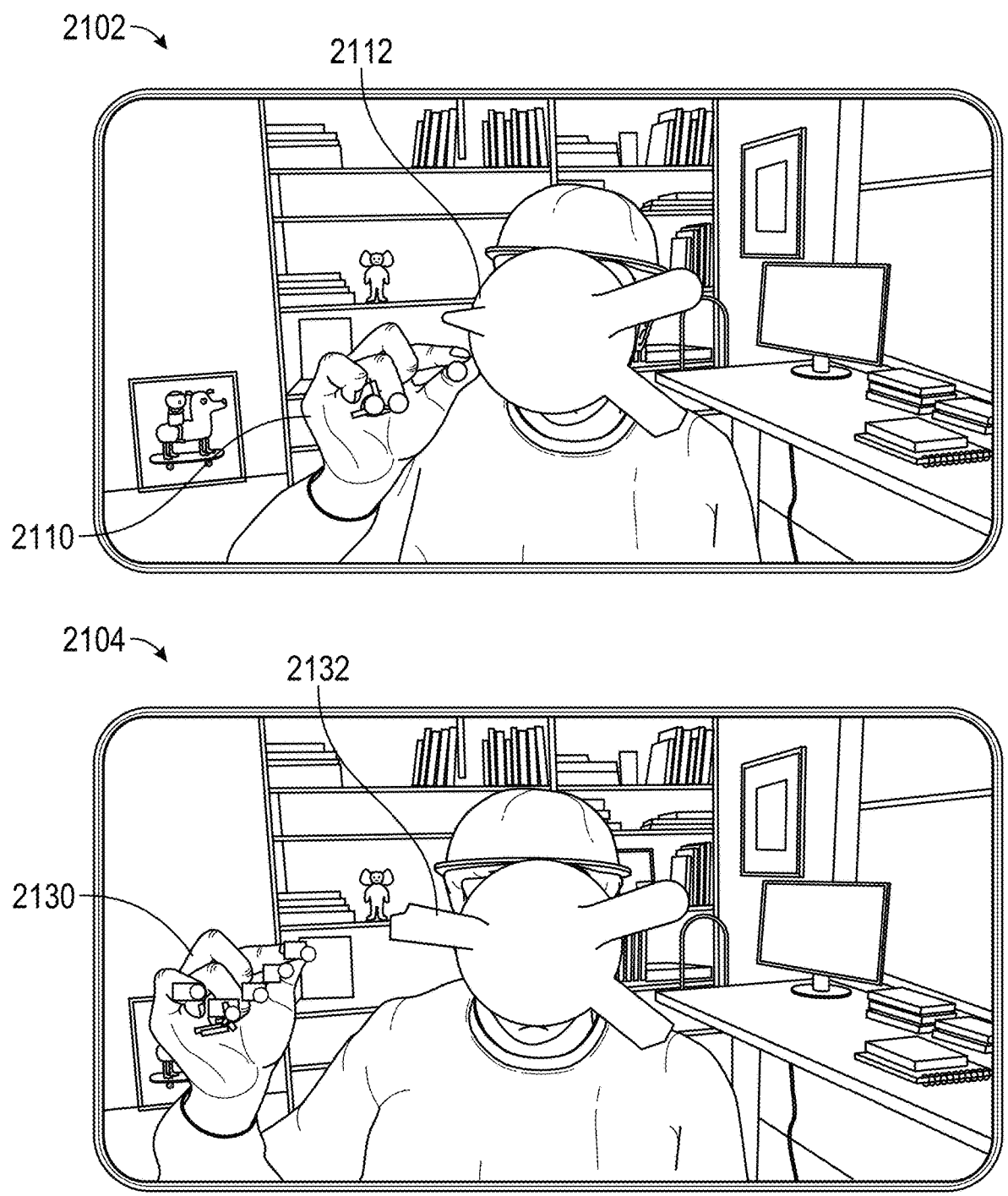
FIG. 21 illustrates example interfaces in accordance with various embodiments.

FIG. 21 illustrates example interfaces in accordance with various embodiments. The example interface can be provided for display on a client device (e.g., the client device 102), such as through an interface(s) of the messaging client 104, application 106, application 508, or application 608. The examples described in FIG. 21 below are a continuation of the discussion from FIG. 20.

As shown, interface 2102 includes location and position 2110 of the user's second hand which has changed, and gesture intent recognition engine 606 utilizes the hand location video frame data and hand position video frame data to generate updated hand gesture data. In this example of FIG. 21, the updated hand gesture data indicates a third portion of virtual object 2032 from FIG. 20 is selected as a third starting point for modifying virtual object 2032 based at least in part on the user's hand movements, which is shown as virtual object 2112 in the render of interface 2102.

As further shown, interface 2104 includes location and position 2130 of the user's second hand has changed, and gesture intent recognition engine 606 utilizes the hand location video frame data and hand position video frame data to generate updated hand gesture data. In this other example of FIG. 21, the updated hand gesture data indicates that virtual object 2112 is to be modified, which is shown as virtual object 2132 in the render of interface 2104 where virtual object 2132 includes third additional graphical data that has extended from the third starting point from interface 2102.

Figure 22:
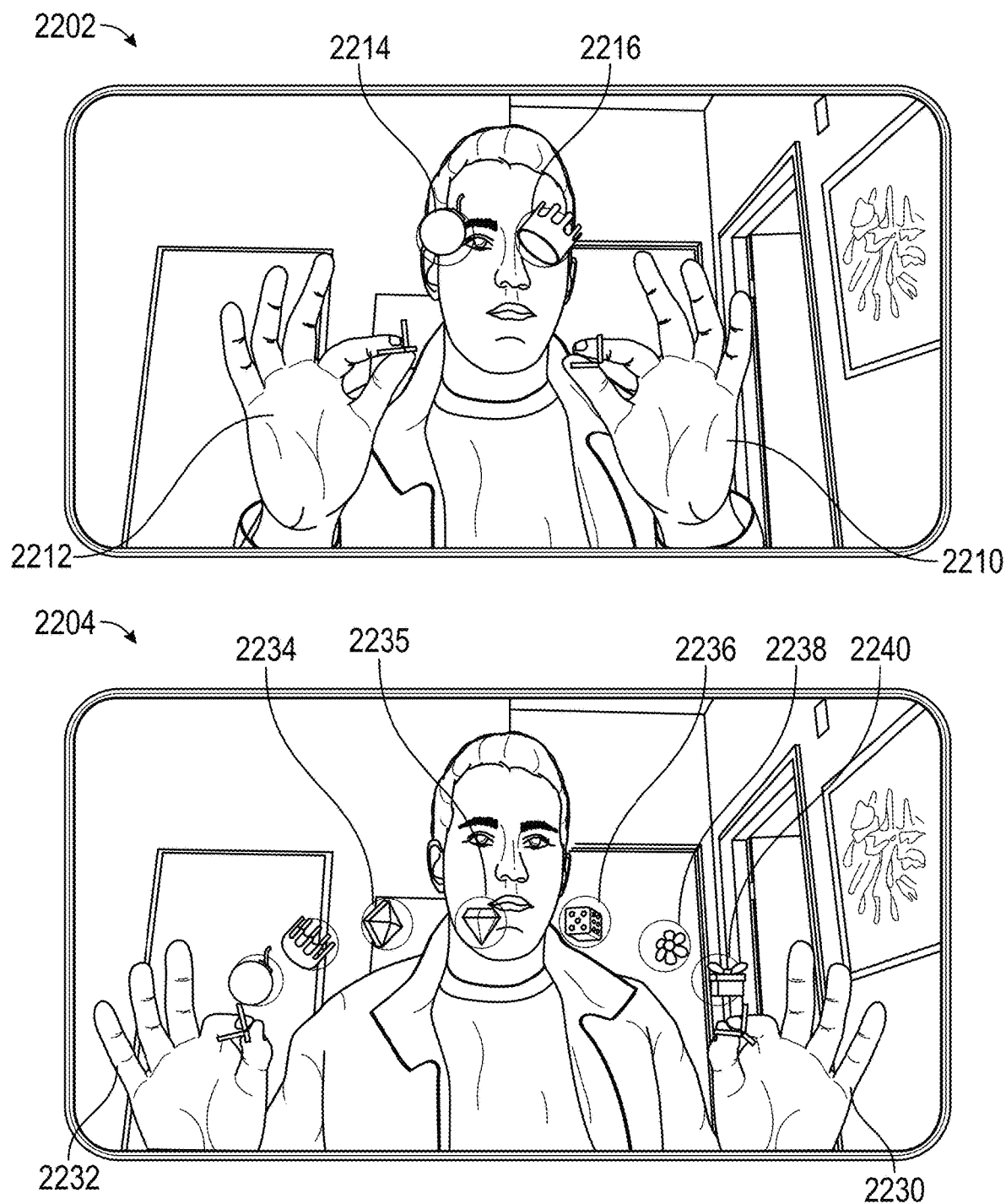
FIG. 22 illustrates example interfaces in accordance with various embodiments.

FIG. 22 illustrates example interfaces in accordance with various embodiments. The example interface can be provided for display on a client device (e.g., the client device 102), such as through an interface(s) of the messaging client 104, application 106, application 508, or application 608.

As shown, interface 2202 includes a real world video frame data of the real world captured by camera 604. The real world video frame data includes one or more of the user's hands within a render of interface 2202, and further includes hand location video frame data and hand position video frame data of the user's hands as the user makes movements with their hands. As further shown, interface 2202 includes virtual object 2214 and virtual object 2216 which can be interacted with and moved using various gestures. A render of interface 2202 illustrates a location and position 2210 of the user's first hand and a location and position 2212 of the user's second hand.

As discussed before, gesture intent recognition engine 606 utilizes the hand location video frame data and hand position video frame data in the real world video frame data to generate hand gesture data including hand gesture categorization information indicating one or more hand gestures being made by the user. In an implementation, the gesture intent recognition engine 606 communicates the hand gesture data to an application that utilized the hand gesture data as an input from a user interface. Such hand gesture data discussed in the examples of FIG. 22, FIG. 23, FIG. 24, and FIG. 25 include data for both of the user's hands such that gesture intent recognition engine 606 is enabled to recognize multi-gesture movements involving both hands, or gesture movements involving one hand.

In the example of FIG. 22, the hand gesture data indicates that additional virtual objects are to be shown in response to the user's hand movements. Each virtual object be utilized by the application for performing a set of operations after being selected based on the user's hand movements.

As further shown, interface 2204 includes location and position 2230 of the user's first hand and a location and position 2232 of the user's second hand which have changed (e.g., each hand have moved outward toward edges of interface 2204), and gesture intent recognition engine 606 utilizes the hand location video frame data and hand position video frame data to generate updated hand gesture data. In this other example of FIG. 22, the updated hand gesture data causes additional virtual objects to be rendered for display, which is shown as virtual object 2234, virtual object 2235, virtual object 2236, virtual object 2238, and virtual object 2240 in the render of interface 2204.

Figure 23:
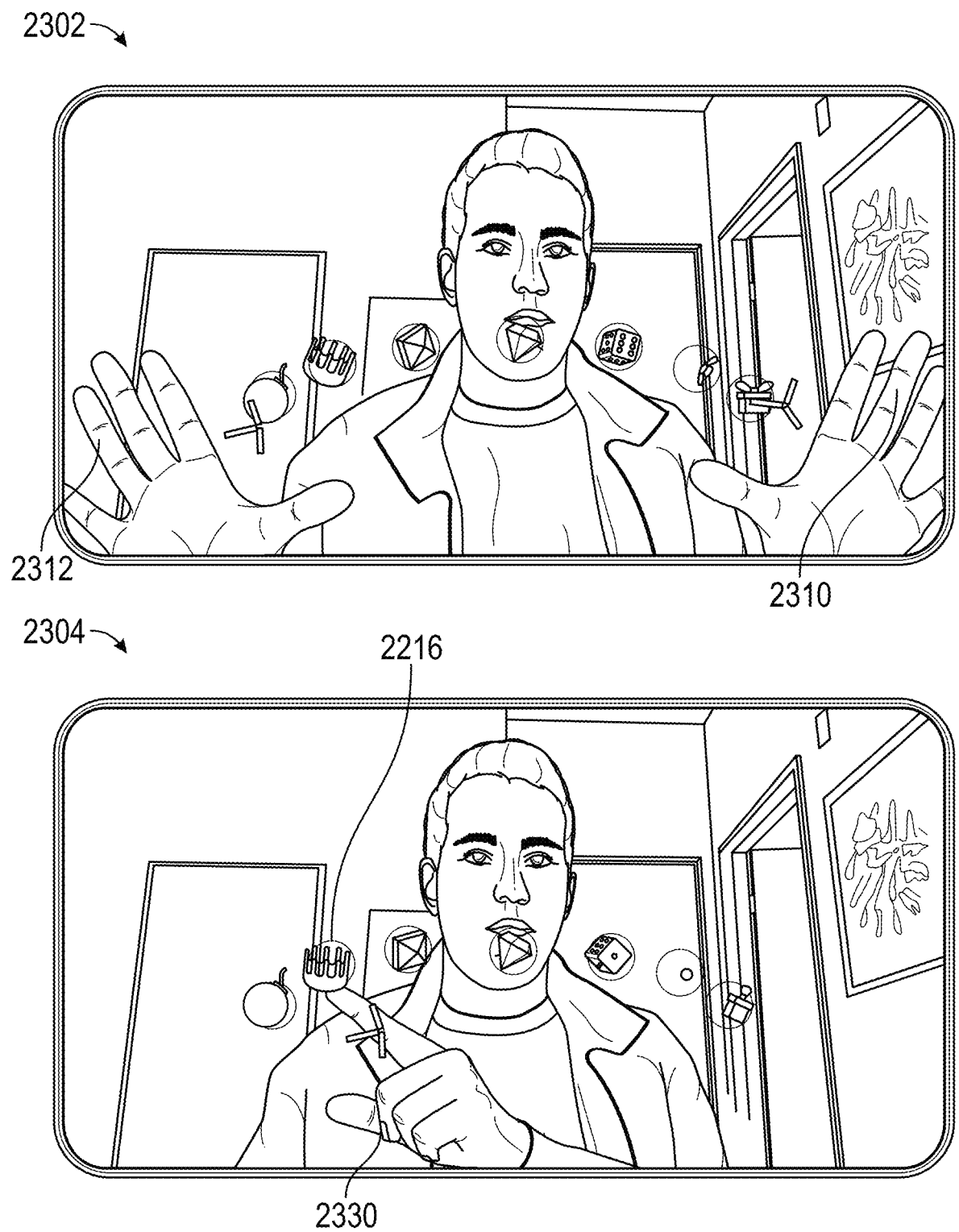
FIG. 23 illustrates example interfaces in accordance with various embodiments.

FIG. 23 illustrates example interfaces in accordance with various embodiments. The example interface can be provided for display on a client device (e.g., the client device 102), such as through an interface(s) of the messaging client 104, application 106, application 508, or application 608. The examples described in FIG. 23 below are a continuation of the discussion from FIG. 22.

As shown, interface 2302 includes location and position 2310 of the user's first hand and a location and position 2312 of the user's second hand which have changed (e.g., open hand gesture where each thumb is spread away from the other fingers in the same hand), and gesture intent recognition engine 606 utilizes the hand location video frame data and hand position video frame data to generate updated hand gesture data. In this example of FIG. 23, the updated hand gesture data indicates the virtual objects have been set to remain or stay fixed at their current locations and position in interface 2302.

As further shown, interface 2304 includes location and position 2330 of the user's first hand which has changed, and gesture intent recognition engine 606 utilizes the hand location video frame data and hand position video frame data to generate updated hand gesture data. In this other example of FIG. 23, the updated hand gesture data indicates that virtual object 2216 is selected which causes an application to perform a corresponding set of operations.

Figure 24:
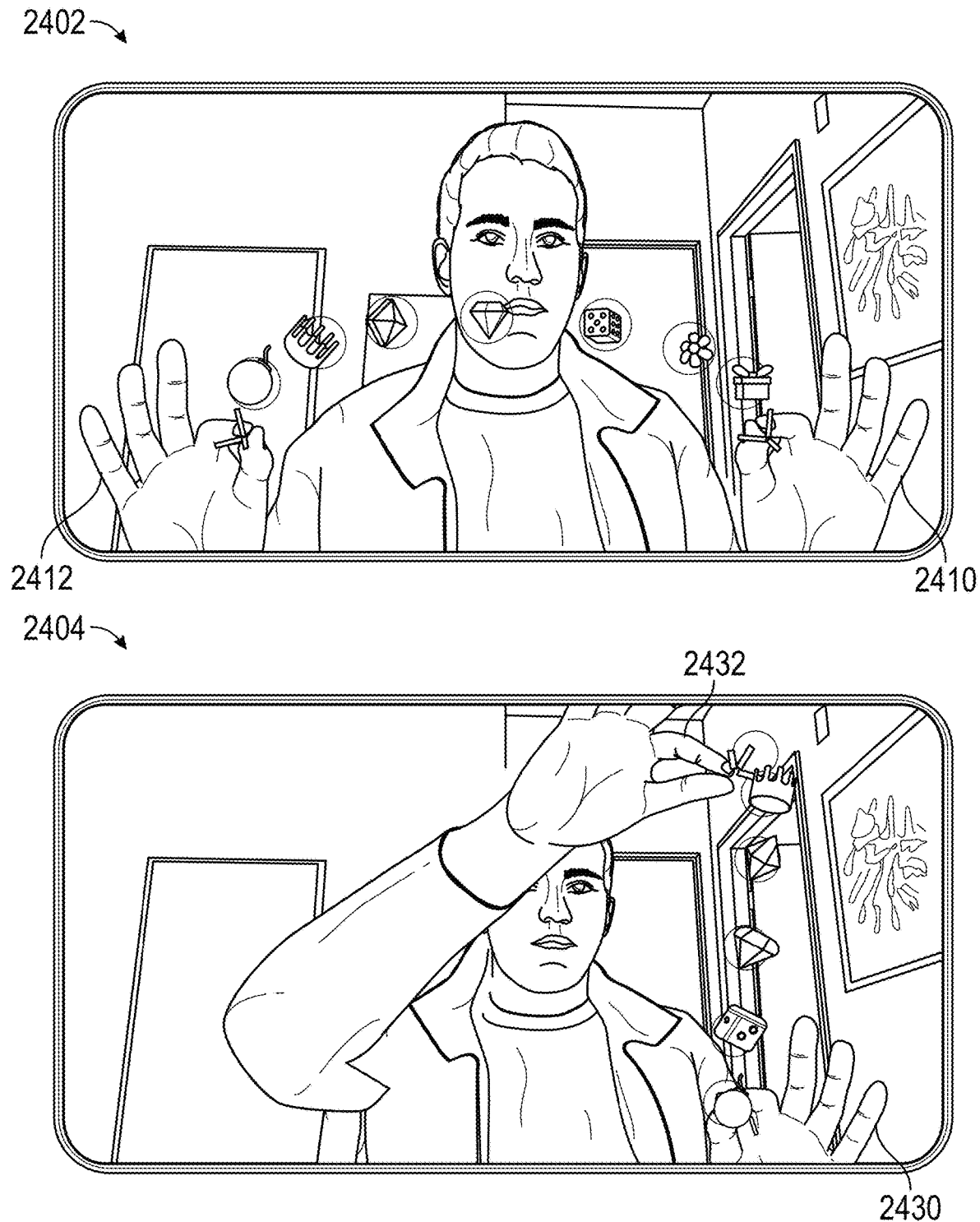
FIG. 24 illustrates example interfaces in accordance with various embodiments.

FIG. 24 illustrates example interfaces in accordance with various embodiments. The example interface can be provided for display on a client device (e.g., the client device 102), such as through an interface(s) of the messaging client 104, application 106, application 508, or application 608. The examples described in FIG. 24 below are a continuation of the discussion from FIG. 23.

As shown, interface 2402 includes location and position 2410 of the user's first hand and a location and position 2412 of the user's second hand which have changed (e.g., from an open hand to a pinch gesture for both hands), and gesture intent recognition engine 606 utilizes the hand location video frame data and hand position video frame data to generate updated hand gesture data. In this example of FIG. 24, the updated hand gesture data indicates the virtual objects are to be moved in response to the user's hand movements.

As further shown, interface 2404 includes location and position 2430 of the user's first hand and a location and position 2432 of the user's second hand which have changed (e.g., the second hand has moved toward the upper edge of interface 2404 and the first hand has moved downward toward the lower edge of interface 2404), and gesture intent recognition engine 606 utilizes the hand location video frame data and hand position video frame data to generate updated hand gesture data. In this other example of FIG. 22, the updated hand gesture data causes virtual objects to be situated in a vertical arrangement in the render of interface 2404.

Figure 25:
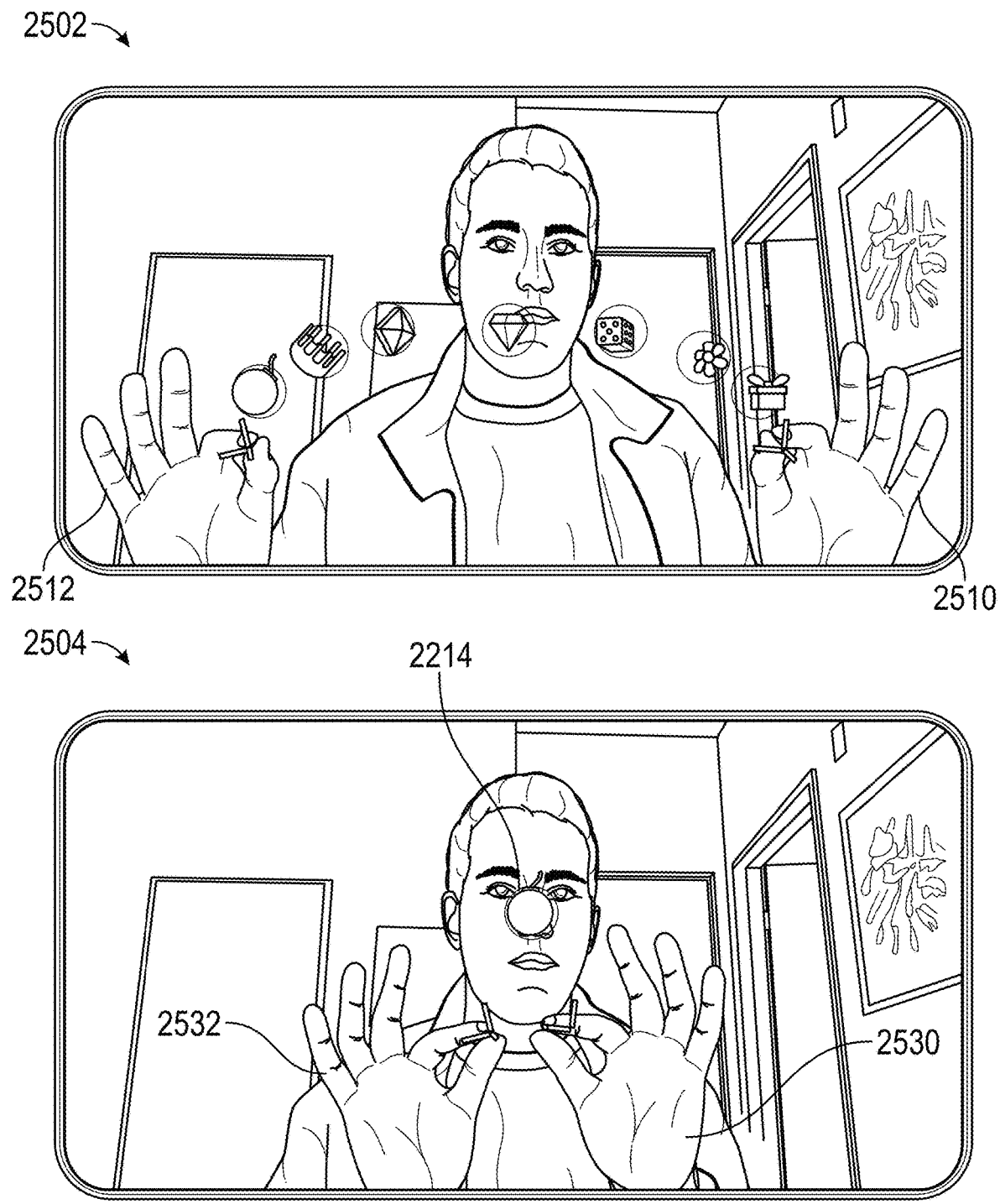
FIG. 25 illustrates example interfaces in accordance with various embodiments.

FIG. 25 illustrates example interfaces in accordance with various embodiments. The example interface can be provided for display on a client device (e.g., the client device 102), such as through an interface(s) of the messaging client 104, application 106, application 508, or application 608. The examples described in FIG. 25 below are a continuation of the discussion from FIG. 24.

As shown, interface 2502 includes location and position 2510 of the user's first hand and a location and position 2512 of the user's second hand which have changed, and gesture intent recognition engine 606 utilizes the hand location video frame data and hand position video frame data to generate updated hand gesture data. In this example of FIG. 25, the updated hand gesture data indicates the virtual objects are to be moved in response to the user's hand movements. In this example of FIG. 25, the updated hand gesture data causes virtual objects to be situated in an arching and horizontal arrangement in the render of interface 2502.

As further shown, interface 2504 includes location and position 2530 of the user's first hand and a location and position 2532 of the user's second hand which have changed (e.g., the second hand has moved toward the center of interface 2504 and the first hand has moved toward the center of interface 2504), and gesture intent recognition engine 606 utilizes the hand location video frame data and hand position video frame data to generate updated hand gesture data. In this other example of FIG. 25, the updated hand gesture data causes other virtual objects to be removed in the render of interface 2504 with only virtual object 2214 remaining in interface 2504.

FIG. 26 is a flowchart illustrating a method 2600, according to certain example embodiments. The method 2600 may be embodied in computer-readable instructions for execution by one or more computer processors such that the operations of the method 2600 may be performed in part or in whole by the messaging client 104, particularly with respect to respective components described above in FIG. 5 and FIG. 6, or an application (e.g., application 106) executing on a given client device (e.g., client device 102) that is communicating in conjunction with messaging server system 108 and components thereof; accordingly, the method 2600 is described below by way of example with reference thereto. However, it shall be appreciated that at least some of the operations of the method 2600 may be deployed on various other hardware configurations and the method 2600 is not intended to be limited to the messaging client 104 or any components or systems mentioned above.

The operations described in FIG. 26, in an embodiment, correspond to at least the description of FIG. 11 and FIG. 12, as discussed above.

At operation 2602, the messaging client 104 receives a set of frames captured by a camera of a client device.

At operation 2604, the messaging client 104 detects, from the set of frames, a first gesture corresponding to an open trigger finger gesture.

At operation 2606, the messaging client 104 receives a second set of frames captured by the camera of the client device.

At operation 2608, the messaging client 104 detects, from the second set of frames, a second gesture corresponding to a closed trigger finger gesture.

At operation 2610, the messaging client 104 detects a location and a position of a representation of a finger from the closed trigger finger gesture.

At operation 2612, the messaging client 104 generates a first virtual object based at least in part on the location and the position of the representation of the finger.

At operation 2614, the messaging client 104 renders a movement of the first virtual object along a vector away from the location and the position of the representation of the finger within a first scene.

At operation 2616, the messaging client 104 provides for display the rendered movement of the first virtual object along the vector within the first scene.

In an embodiment, the open trigger finger gesture includes a particular gesture including a thumb and an index finger indicating a firearm or shooting hand sign, and the closed trigger finger gesture includes the thumb and the index finger pointing in a same direction.

In an embodiment, the movement for the first virtual object moves the first virtual object across a particular outer boundary of the first scene and outside a view of the first scene, where the first scene comprises a first representation of a real world scene and the first virtual object.

In an embodiment, the first virtual object includes a representation of a projectile or missile to be fired from a firearm.

In an embodiment, the messaging client 104 while rendering the movement of the first virtual object, generates a second virtual object based at least in part on a second location and a second position of the representation of the finger, renders a movement of the second virtual object along a second vector away from the location and the position of the representation of the finger within a first scene, where the first scene include a first representation of a real world scene, the first virtual object, and the second virtual object, and provides for display the rendered movement of the second virtual object along the second vector within the first scene.

In an embodiment, the second virtual object and the first virtual object are a same type of virtual object, or the second virtual object and the first virtual object are different types of virtual objects. In an embodiment, the second vector is a same vector as the vector, or the second vector is a different vector than the vector.

In an embodiment, the vector away from the location and the position of the representation of the finger is determined based on raycasting a path from the location and the position of the representation of the finger to a point along a particular outer boundary of the first scene.

In an embodiment, the second vector away from the second location and the second position of the representation of the finger is determined based on raycasting a second path from the second location and the second position of the representation of the finger to a second point along the particular outer boundary of the first scene, the second point is different from the point or the second point is a same point as the point.

In an embodiment, rendering the movement of the second virtual object occurs during the movement of the first virtual object and before the first virtual object moves across a particular outer boundary of the first scene and outside a view of the first scene.

In an embodiment, the rendered movement of the first virtual object is provided for display within a messaging application executing on the client device.

Machine Architecture

Figure 27:
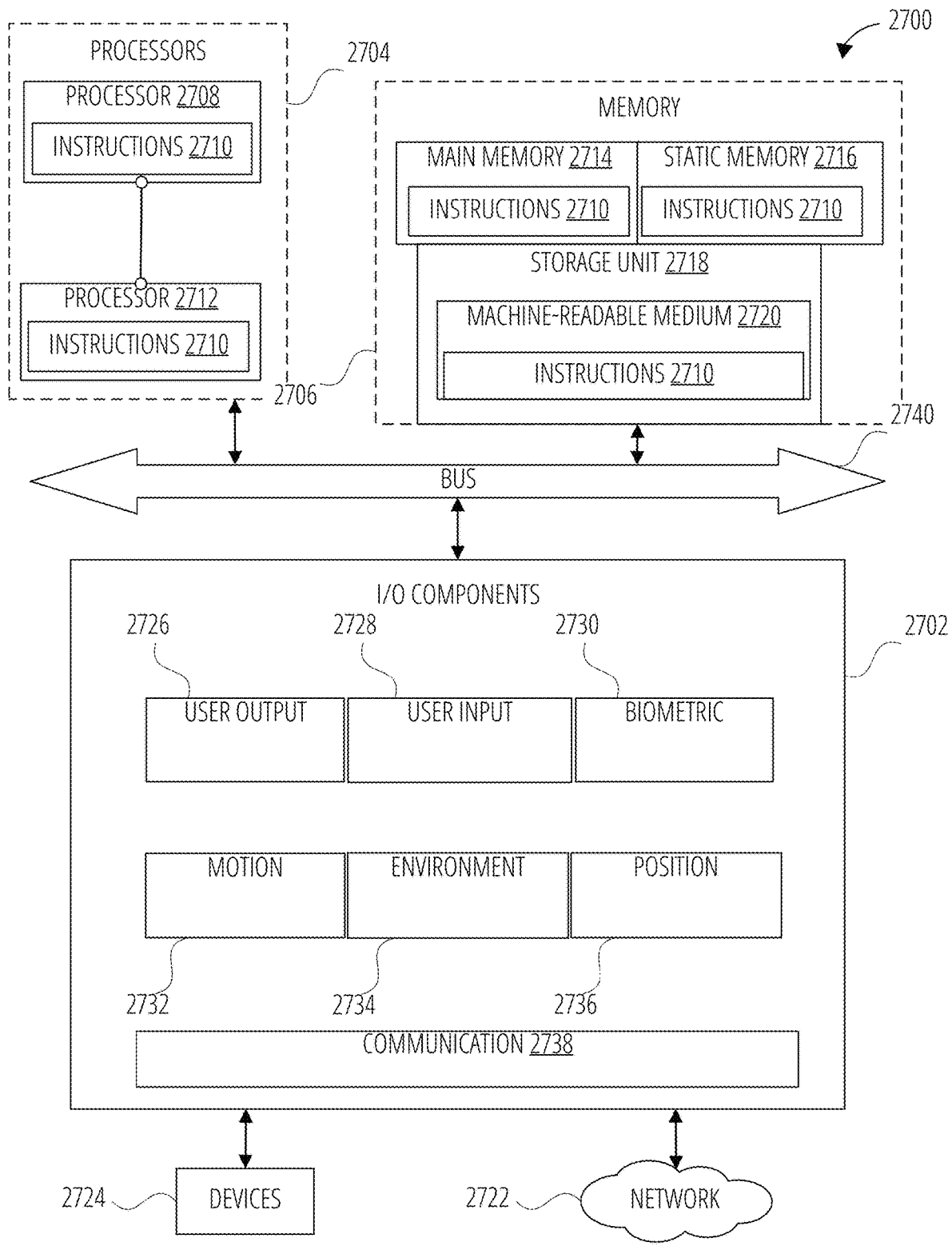
FIG. 27 is a diagrammatic representation of a machine in the form of a computer system within which a set of instructions may be executed for causing the machine to perform any one or more of the methodologies discussed herein, in accordance with some examples.

FIG. 27 is a diagrammatic representation of the machine 2700 within which instructions 2710 (e.g., software, a program, an application, an applet, an app, or other executable code) for causing the machine 2700 to perform any one or more of the methodologies discussed herein may be executed. For example, the instructions 2710 may cause the machine 2700 to execute any one or more of the methods described herein. The instructions 2710 transform the general, non-programmed machine 2700 into a particular machine 2700 programmed to carry out the described and illustrated functions in the manner described. The machine 2700 may operate as a standalone device or may be coupled (e.g., networked) to other machines. In a networked deployment, the machine 2700 may operate in the capacity of a server machine or a client machine in a server-client network environment, or as a peer machine in a peer-to-peer (or distributed) network environment. The machine 2700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 2710, sequentially or otherwise, that specify actions to be taken by the machine 2700. Further, while only a single machine 2700 is illustrated, the term "machine" shall also be taken to include a collection of machines that individually or jointly execute the instructions 2710 to perform any one or more of the methodologies discussed herein. The machine 2700, for example, may comprise the client device 102 or any one of a number of server devices forming part of the messaging server system 108. In some examples, the machine 2700 may also comprise both client and server systems, with certain operations of a particular method or algorithm being performed on the server-side and with certain operations of the particular method or algorithm being performed on the client-side.

The machine 2700 may include processors 2704, memory 2706, and input/output I/O components 2702, which may be configured to communicate with each other via a bus 2740. In an example, the processors 2704 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 2708 and a processor 2712 that execute the instructions 2710. The term "processor" is intended to include multi-core processors that may comprise two or more independent processors (sometimes referred to as "cores") that may execute instructions contemporaneously. Although FIG. 27 shows multiple processors 2704, the machine 2700 may include a single processor with a single-core, a single processor with multiple cores (e.g., a multi-core processor), multiple processors with a single core, multiple processors with multiples cores, or any combination thereof.

The memory 2706 includes a main memory 2714, a static memory 2716, and a storage unit 2718, both accessible to the processors 2704 via the bus 2740. The main memory 2706, the static memory 2716, and storage unit 2718 store the instructions 2710 embodying any one or more of the methodologies or functions described herein. The instructions 2710 may also reside, completely or partially, within the main memory 2714, within the static memory 2716, within machine-readable medium 2720 within the storage unit 2718, within at least one of the processors 2704 (e.g., within the Processor's cache memory), or any suitable combination thereof, during execution thereof by the machine 2700.

The I/O components 2702 may include a wide variety of components to receive input, provide output, produce output, transmit information, exchange information, capture measurements, and so on. The specific I/O components 2702 that are included in a particular machine will depend on the type of machine. For example, portable machines such as mobile phones may include a touch input device or other such input mechanisms, while a headless server machine will likely not include such a touch input device. It will be appreciated that the I/O components 2702 may include many other components that are not shown in FIG. 27. In various examples, the I/O components 2702 may include user output components 2726 and user input components 2728. The user output components 2726 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 2728 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 2702 may include biometric components 2730, motion components 2732, environmental components 2734, or position components 2736, among a wide array of other components. For example, the biometric components 2730 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 2732 include acceleration sensor components (e.g., accelerometer), gravitation sensor components, rotation sensor components (e.g., gyroscope).

The environmental components 2734 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera and a depth sensor, for example.

The position components 2736 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 2702 further include communication components 2738 operable to couple the machine 2700 to a network 2722 or devices 2724 via respective coupling or connections. For example, the communication components 2738 may include a network interface Component or another suitable device to interface with the network 2722. In further examples, the communication components 2738 may include wired communication components, wireless communication components, cellular communication components, Near Field Communication (NFC) components, Bluetooth® components (e.g., Bluetooth® Low Energy), Wi-Fi ° components, and other communication components to provide communication via other modalities. The devices 2724 may be another machine or any of a wide variety of peripheral devices (e.g., a peripheral device coupled via a USB).

Moreover, the communication components 2738 may detect identifiers or include components operable to detect identifiers. For example, the communication components 2738 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 2738, such as location via Internet Protocol (IP) geolocation, location via Wi-Fi® signal triangulation, location via detecting an NFC beacon signal that may indicate a particular location, and so forth.

The various memories (e.g., main memory 2714, static memory 2716, and memory of the processors 2704) and storage unit 2718 may store one or more sets of instructions and data structures (e.g., software) embodying or used by any one or more of the methodologies or functions described herein. These instructions (e.g., the instructions 2710), when executed by processors 2704, cause various operations to implement the disclosed examples.

The instructions 2710 may be transmitted or received over the network 2722, using a transmission medium, via a network interface device (e.g., a network interface component included in the communication components 2738) and using any one of several well-known transfer protocols (e.g., hypertext transfer protocol (HTTP)). Similarly, the instructions 2710 may be transmitted or received using a transmission medium via a coupling (e.g., a peer-to-peer coupling) to the devices 2724.

Software Architecture

Figure 28:
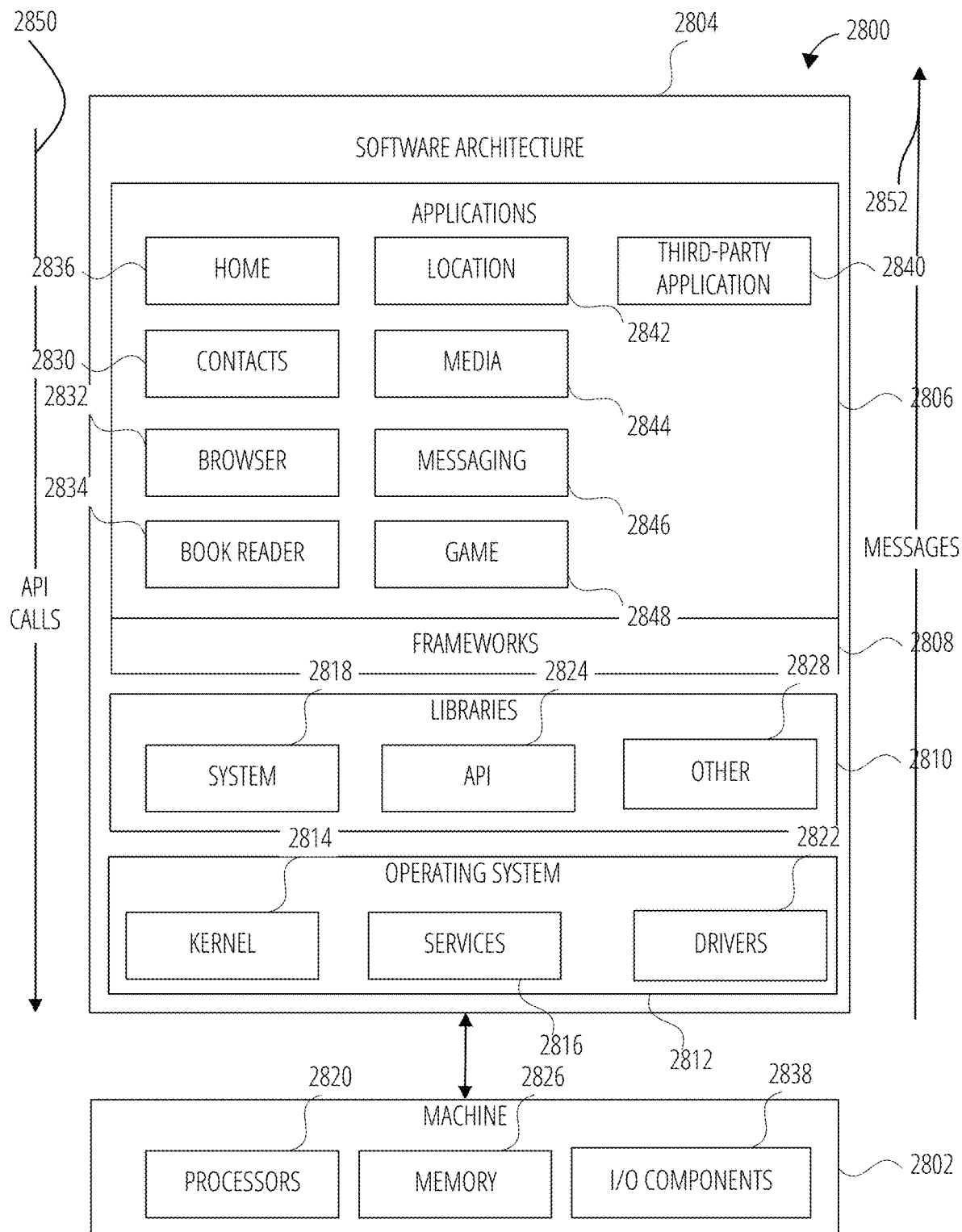
FIG. 28 is a block diagram showing a software architecture within which examples may be implemented.

FIG. 28 is a block diagram 2800 illustrating a software architecture 2804, which can be installed on any one or more of the devices described herein. The software architecture 2804 is supported by hardware such as a machine 2802 that includes processors 2820, memory 2826, and I/O components 2838. In this example, the software architecture 2804 can be conceptualized as a stack of layers, where each layer provides a particular functionality. The software architecture 2804 includes layers such as an operating system 2812, libraries 2810, frameworks 2808, and applications 2806. Operationally, the applications 2806 invoke API calls 2850 through the software stack and receive messages 2852 in response to the API calls 2850.

The operating system 2812 manages hardware resources and provides common services. The operating system 2812 includes, for example, a kernel 2814, services 2816, and drivers 2822. The kernel 2814 acts as an abstraction layer between the hardware and the other software layers. For example, the kernel 2814 provides memory management, processor management (e.g., scheduling), component management, networking, and security settings, among other functionality. The services 2816 can provide other common services for the other software layers. The drivers 2822 are responsible for controlling or interfacing with the underlying hardware. For instance, the drivers 2822 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 2810 provide a common low-level infrastructure used by the applications 2806. The libraries 2810 can include system libraries 2818 (e.g., C standard library) that provide functions such as memory allocation functions, string manipulation functions, mathematic functions, and the like. In addition, the libraries 2810 can include API libraries 2824 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 2810 can also include a wide variety of other libraries 2828 to provide many other APIs to the applications 2806.

The frameworks 2808 provide a common high-level infrastructure that is used by the applications 2806. For example, the frameworks 2808 provide various graphical user interface (GUI) functions, high-level resource management, and high-level location services. The frameworks 2808 can provide a broad spectrum of other APIs that can be used by the applications 2806, some of which may be specific to a particular operating system or platform.

In an example, the applications 2806 may include a home application 2836, a contacts application 2830, a browser application 2832, a book reader application 2834, a location application 2842, a media application 2844, a messaging application 2846, a game application 2848, and a broad assortment of other applications such as a third-party application 2840. The applications 2806 are programs that execute functions defined in the programs. Various programming languages can be employed to create one or more of the applications 2806, structured in a variety of manners, such as object-oriented programming languages (e.g., Objective-C, Java, or C++) or procedural programming languages (e.g., C or assembly language). In a specific example, the third-party application 2840 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 2840 can invoke the API calls 2850 provided by the operating system 2812 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method, comprising:
receiving, using one or more hardware processors, a set of frames captured by a camera of a client device;
detecting, using the one or more hardware processors, from the set of frames, a first gesture corresponding to an open trigger finger gesture;
receiving, using the one or more hardware processors, a second set of frames captured by the camera of the client device;
detecting, using the one or more hardware processors, from the second set of frames, a second gesture corresponding to a closed trigger finger gesture;
detecting, using the one or more hardware processors, a location and a position of a representation of a finger from the closed trigger finger gesture;
generating, using the one or more hardware processors, a first virtual object based at least in part on the location and the position of the representation of the finger;
rendering, using the one or more hardware processors, a movement of the first virtual object along a vector away from the location and the position of the representation of the finger within a first scene, wherein rendering the movement of the first virtual object comprises:
while rendering the movement of the first virtual object, generating a second virtual object based at least in part on a second location and a second position of the representation of the finger;
rendering a movement of the second virtual object along a second vector away from the location and the position of the representation of the finger within a first scene, wherein the first scene comprises a first representation of a real world scene, the first virtual object, and the second virtual object; and
providing for display the rendered movement of the second virtual object along the second vector within the first scene; and
providing for display, using the one or more hardware processors, the rendered movement of the first virtual object along the vector within the first scene.

2. The method of claim 1, wherein the open trigger finger gesture includes a particular gesture including a thumb and an index finger indicating a firearm or shooting hand sign, and the closed trigger finger gesture includes the thumb and the index finger pointing in a same direction.

3. The method of claim 1, wherein the movement for the first virtual object moves the first virtual object across a particular outer boundary of the first scene and outside a view of the first scene, wherein the first scene comprises a first representation of a real world scene and the first virtual object.

4. The method of claim 1, wherein the first virtual object comprises a representation of a projectile or missile to be fired from a firearm.

5. The method of claim 1, wherein the second virtual object and the first virtual object are a same type of virtual object, or the second virtual object and the first virtual object are different types of virtual objects,
wherein the second vector is a same vector as the vector, or the second vector is a different vector than the vector.

6. The method of claim 1, wherein the vector away from the location and the position of the representation of the finger is determined based on raycasting a path from the location and the position of the representation of the finger to a point along a particular outer boundary of the first scene.

7. The method of claim 6, wherein the second vector away from the second location and the second position of the representation of the finger is determined based on raycasting a second path from the second location and the second position of the representation of the finger to a second point along the particular outer boundary of the first scene, the second point is different from the point or the second point is a same point as the point.

8. The method of claim 1, wherein rendering the movement of the second virtual object occurs during the movement of the first virtual object and before the first virtual object moves across a particular outer boundary of the first scene and outside a view of the first scene.

9. The method of claim 1, wherein the rendered movement of the first virtual object is provided for display within a messaging application executing on the client device.

10. A system comprising:
a processor; and
a memory including instructions that, when executed by the processor, cause the processor to perform operations comprising:
receiving a set of frames captured by a camera of a client device;
detecting from the set of frames, a first gesture corresponding to an open trigger finger gesture;
receiving a second set of frames captured by the camera of the client device;
detecting from the second set of frames, a second gesture corresponding to a closed trigger finger gesture;
detecting a location and a position of a representation of a finger from the closed trigger finger gesture;
generating a first virtual object based at least in part on the location and the position of the representation of the finger;
rendering a movement of the first virtual object along a vector away from the location and the position of the representation of the finger within a first scene, wherein rendering the movement of the first virtual object comprises:
while rendering the movement of the first virtual object, generating a second virtual object based at least in part on a second location and a second position of the representation of the finger;
rendering a movement of the second virtual object along a second vector away from the location and the position of the representation of the finger within a first scene, wherein the first scene comprises a first representation of a real world scene, the first virtual object, and the second virtual object; and
providing for display the rendered movement of the second virtual object along the second vector within the first scene; and
providing for display the rendered movement of the first virtual object along the vector within the first scene.

11. The system of claim 10, wherein the open trigger finger gesture includes a particular gesture including a thumb and an index finger indicating a firearm or shooting hand sign, and the closed trigger finger gesture includes the thumb and the index finger pointing in a same direction.

12. The system of claim 10, wherein the movement for the first virtual object moves the first virtual object across a particular outer boundary of the first scene and outside a view of the first scene, wherein the first scene comprises a first representation of a real world scene and the first virtual object.

13. The system of claim 10, wherein the first virtual object comprises a representation of a projectile or missile to be fired from a firearm.

14. The system of claim 10, wherein the second virtual object and the first virtual object are a same type of virtual object, or the second virtual object and the first virtual object are different types of virtual objects,
wherein the second vector is a same vector as the vector, or the second vector is a different vector than the vector.

15. The system of claim 10, wherein the vector away from the location and the position of the representation of the finger is determined based on raycasting a path from the location and the position of the representation of the finger to a point along a particular outer boundary of the first scene.

16. The system of claim 15, wherein the second vector away from the second location and the second position of the representation of the finger is determined based on raycasting a second path from the second location and the second position of the representation of the finger to a second point along the particular outer boundary of the first scene, the second point is different from the point or the second point is a same point as the point.

17. The system of claim 10, wherein rendering the movement of the second virtual object occurs during the movement of the first virtual object and before the first virtual object moves across a particular outer boundary of the first scene and outside a view of the first scene.

18. A non-transitory computer-readable medium comprising instructions, which when executed by a computing device, cause the computing device to perform operations comprising:

receiving a set of frames captured by a camera of a client device;
detecting from the set of frames, a first gesture corresponding to an open trigger finger gesture;
receiving a second set of frames captured by the camera of the client device;
detecting from the second set of frames, a second gesture corresponding to a closed trigger finger gesture;
detecting a location and a position of a representation of a finger from the closed trigger finger gesture;
generating a first virtual object based at least in part on the location and the position of the representation of the finger;
rendering a movement of the first virtual object along a vector away from the location and the position of the representation of the finger within a first scene, wherein rendering the movement of the first virtual object comprises:
while rendering the movement of the first virtual object, generating a second virtual object based at least in part on a second location and a second position of the representation of the finger;
rendering a movement of the second virtual object along a second vector away from the location and the position of the representation of the finger within a first scene, wherein the first scene comprises a first representation of a real world scene, the first virtual object, and the second virtual object; and
providing for display the rendered movement of the second virtual object along the second vector within the first scene; and
providing for display the rendered movement of the first virtual object along the vector within the first scene.

* * * * *